(12) United States Patent
Sharp et al.

(10) Patent No.: US 8,610,762 B2
(45) Date of Patent: Dec. 17, 2013

(54) MULTI-FUNCTIONAL ACTIVE MATRIX LIQUID CRYSTAL DISPLAYS

(75) Inventors: Gary D. Sharp, Boulder, CO (US); Michael G. Robinson, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

(21) Appl. No.: 13/561,827

(22) Filed: Jul. 30, 2012

(65) Prior Publication Data
US 2012/0293747 A1 Nov. 22, 2012

Related U.S. Application Data

(63) Continuation of application No. 11/673,556, filed on Feb. 9, 2007, now Pat. No. 8,233,034.

(60) Provisional application No. 60/744,100, filed on Mar. 31, 2006, provisional application No. 60/772,251, filed on Feb. 10, 2006.

(51) Int. Cl.
*H04N 13/04* (2006.01)

(52) U.S. Cl.
USPC ............................................... 348/53; 348/51

(58) Field of Classification Search
USPC ................................................... 348/42–60
See application file for complete search history.

(56) References Cited

U.S. PATENT DOCUMENTS

| | | | |
|---|---|---|---|
| 4,134,644 A | 1/1979 | Marks et al. | |
| 4,281,341 A | 7/1981 | Byatt | |
| 4,290,675 A | 9/1981 | Beiser | |
| 4,620,770 A | 11/1986 | Wexler | |
| 4,692,792 A | 9/1987 | Street | |
| 4,719,507 A * | 1/1988 | Bos ................................. | 348/57 |
| 4,995,718 A | 2/1991 | Jachimowicz et al. | |
| 5,260,729 A | 11/1993 | Ullah et al. | |

(Continued)

FOREIGN PATENT DOCUMENTS

| | | |
|---|---|---|
| JP | H10-239641 A | 9/1998 |
| JP | 2003-264853 A | 9/2003 |
| JP | 2004-333561 A1 | 11/2004 |
| WO | 2005039192 A1 | 4/2005 |

OTHER PUBLICATIONS

Cheng, Wayne, 40.3: Power Minimization of LED Backlight in a Color Sequential Display, SID 05 Digest, pp. 1384-1387 (2005).

(Continued)

*Primary Examiner* — Brendan Higa
(74) *Attorney, Agent, or Firm* — Neil G. J. Mothew; Darlene K. Kondo

(57) ABSTRACT

A direct view display provides a light modulating panel and a backlight including first and second sets of spectral emitters. The first set of spectral emitters generate a first light bundle and the second set of spectral emitters generate a second light bundle. Several modes of operation may be provided including (1) an advanced 2D mode, (2) an enhanced color gamut mode employing simultaneous illumination of the first and second set of spectral emitters, (3) a privacy screen mode, (4) a channel multiplexed mode, and (5) a stereoscopic image mode. The latter three modes utilize the first and second set of spectral emitters to alternately illuminate a portion of the light modulating panel. Images and representations generated by the direct view display operating in the latter three modes are viewed using appropriate eyewear having filters with passband characteristics to transmit the respective light bundle.

15 Claims, 19 Drawing Sheets

(56) References Cited

U.S. PATENT DOCUMENTS

| | | | |
|---|---|---|---|
| 5,537,476 | A | 7/1996 | Coteus et al. |
| 5,564,810 | A | 10/1996 | Larson |
| 5,751,384 | A | 5/1998 | Sharp |
| 5,774,261 | A | 6/1998 | Omori et al. |
| 5,963,371 | A | 10/1999 | Needham et al. |
| 6,002,518 | A * | 12/1999 | Faris .......................... 359/465 |
| 6,252,570 | B1 | 6/2001 | Mangerson et al. |
| 6,252,624 | B1 * | 6/2001 | Yuasa et al. ...................... 348/56 |
| 6,283,597 | B1 | 9/2001 | Jorke |
| 6,307,585 | B1 | 10/2001 | Hentschke |
| 6,449,005 | B1 | 9/2002 | Faris |
| 6,608,614 | B1 | 8/2003 | Johnson |
| 6,680,578 | B2 | 1/2004 | Antoniadis |
| 6,687,003 | B1 | 2/2004 | Sorensen et al. |
| 6,698,890 | B1 | 3/2004 | Jorke |
| 6,769,772 | B2 * | 8/2004 | Roddy et al. .................... 353/31 |
| 6,829,383 | B1 | 12/2004 | Berestov |
| 6,867,775 | B2 | 3/2005 | Buck et al. |
| 6,888,529 | B2 | 5/2005 | Bruning et al. |
| 6,911,963 | B2 | 6/2005 | Baba et al. |
| 6,956,964 | B2 | 10/2005 | Lee et al. |
| 6,975,345 | B1 | 12/2005 | Lipton et al. |
| 6,975,369 | B1 | 12/2005 | Burkholder |
| 6,980,177 | B2 | 12/2005 | Struyk |
| 7,001,021 | B2 | 2/2006 | Jorke |
| 7,002,546 | B1 | 2/2006 | Stuppi et al. |
| 7,002,619 | B1 | 2/2006 | Dean et al. |
| 7,106,509 | B2 * | 9/2006 | Sharp ....................... 359/488.01 |
| 7,477,206 | B2 * | 1/2009 | Cowan et al. .................... 345/6 |
| 7,483,209 | B2 | 1/2009 | Nam et al. |
| 7,705,935 | B2 | 4/2010 | Gaudreau |
| 7,866,869 | B2 | 1/2011 | Karakawa |
| 2002/0180659 | A1 | 12/2002 | Takahashi |
| 2003/0184571 | A1 | 10/2003 | Hirayama |
| 2004/0041747 | A1 | 3/2004 | Uehara |
| 2004/0070736 | A1 | 4/2004 | Roddy et al. |
| 2004/0135754 | A1 | 7/2004 | Conner et al. |
| 2004/0169919 | A1 | 9/2004 | Uehara et al. |
| 2005/0007516 | A1 | 1/2005 | Hong et al. |
| 2005/0094267 | A1 * | 5/2005 | Huber .......................... 359/464 |
| 2005/0151152 | A1 | 7/2005 | Miller et al. |
| 2005/0225502 | A1 | 10/2005 | Nam et al. |
| 2005/0225630 | A1 | 10/2005 | Childers et al. |
| 2005/0231459 | A1 | 10/2005 | Furukawa |
| 2006/0007110 | A1 | 1/2006 | Hung et al. |
| 2007/0046777 | A1 | 3/2007 | Song et al. |
| 2007/0085789 | A1 | 4/2007 | De Vaan |
| 2007/0206155 | A1 * | 9/2007 | Lipton .............................. 353/7 |
| 2008/0062259 | A1 * | 3/2008 | Lipton et al. .................... 348/58 |
| 2010/0171816 | A1 | 7/2010 | Ko |
| 2010/0208041 | A1 | 8/2010 | Savvateev et al. |
| 2010/0225836 | A1 | 9/2010 | Ockenfuss |

OTHER PUBLICATIONS

Folkerts, Wiep, 41.3: Invited Paper: LED Backlighting Concepts with High Flux LED's, SID 04 Digest, pp. 1226-1229 (2004).

Robinson et al., Polarization Engineering for LCD Projection, Jun. 28, 2005, John Wiley & Sons Ltd., Chichester, England.

International preliminary report on patentability in corresponding PCT application No. PCT/US2007/061955 mailed Aug. 21, 2008.

International Search Report and Written Opinion of International Searching Authority in corresponding PCT/US07/61955 mailed Mar. 27, 2008.

Ito et al., 17.3: OCB-WV Film for Fast-Response-Time and Wide-Viewing-Angle LCD TV's, SID 05 Digest, pp. 986-989 (2005).

Jak et al., 25.3: Spectrum Sequential Liquid Crystal Display, SID 05 Digest, pp. 1120-1123 (2005).

Konno et al., 40.2: RGB Color Control System for LED Backlights in IPS-LCD TVs, SID 05 Digest, pp. 1380-1383 (2005).

Lee et al., 40.1: Distinguished Contributed Paper: Integrated Amorphous Silicon Color Sensor on LCD Panel for LED Backlight Feedback Control System, SID 05 Digest, pp. 1376-1379 (2005).

Lipton et al., An Improved BYATI Modulator, SPIE vol. 3295, pp. 121-126 (1998).

Martynov et al., 43.3: High-efficiency Slim LED Backlight System with Mixing Light Guide, SID 03 Digest, pp. 1259-1261 (2003).

Nesterenko et al., 40.4: Design and Analysis of Tapered Waveguides as Collimators for LED Backlighting, SID 05 Digest, pp. 1388-1391 (2005).

Notice of Reasons for Rejection for Japanese Patent Application No. JP2008-544533 dated Feb. 24, 2012.

Ohtsuki et al., 40.5L: Late-News Paper: 18.1-inch XGA TFT-LCD with Wide Color Reproduction using Hgh Power LED-Backlighting, SID 02 Digest, pp. 1154-1157 (2002).

Perduijn et al., 43.2: Light Output Feedback Solution for RGB LED Backlight Applications, SID 03 Digest, pp. 1254-1257 (2003).

Roosendaal, 25.2: A Wide Gamut, High Aperture Mobile Spectrum Sequential Liquid Crystal Display, SID 05 Digest, pp. 1116-1119 (2005).

Sakai et al., 41.1: A Thin LED Backlight System with High Efficiency for Backlighting 22-in. TFT-LCD's, SID 04 Digest, pp. 1218-1221 (2004).

Sluyterman et al., 18.2: Architectural Choices in a Scanning Backlight for Large LCD TV's, SID 05 Digest, pp. 996-999 (2005).

Sugiura et al., 25.4: Six-Primary-Color 23-in WXGA LCD using Six-Color LEOs, SID 05 Digest, pp. 1124-1127 (2005).

Sugiura et al., 41.4: Late-News Paper: Wide Color Gamut and High Brightness Assured by the Support of LED Backlighting in WUXGA LCD Monitor, SID 04 Digest, pp. 1230-1231 (2004).

Sugiura et al., 43.5L: Late News paper: Prototype of a Wide Gamut Monitor Adopting an LED-Backlighting LCD Panel, SID 03 Digest, pp. 1266-1269 (2003).

Supplementary European search report for Eurpoean Application No. EP07756847 mailed Jul. 14, 2010.

Szaflarski. Access Excellence Classic Collection How We See: The First Steps of Human Vision [online]. Nov. 29, 1999 [retrieved on Nov. 14, 2007]. Retrieved from Internet: <URL:http://web.archive.org/web/19991006164258/www.accessexcellence .org/ AE/ AEC/ CC/vision_background .him I>.

Taira et al., 43.1: Color Filterless Liquid Crystal Display Illuminated with LEOs, SID 03 Digest, pp. 1250-1253 (2003).

West et al., 43.4 High Brightness Direct LED Backlight for LCD-TV,SID 03 Digest, pp. 1262-1265 (2003).

Zwanenburg et al., 41.2: High-efficiency LEOs for LCD Backlights, SID 04 Digest, pp. 1222-1225 (2004).

Summary of Final Notice of Reason for Rejection dated Mar. 19, 2013 in Japanese Patent Application No. 2008-554533.

Examination report from European application No. 07756847.5 dated Feb. 2, 2013.

* cited by examiner

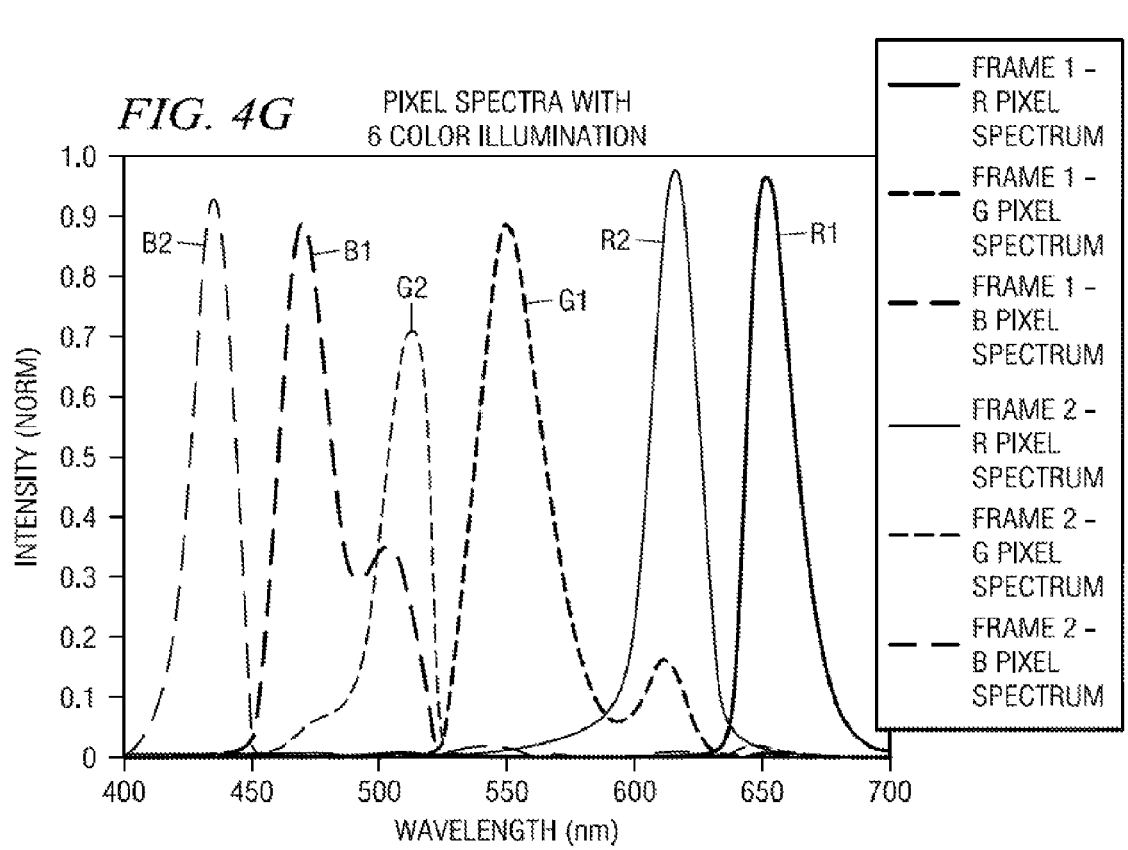
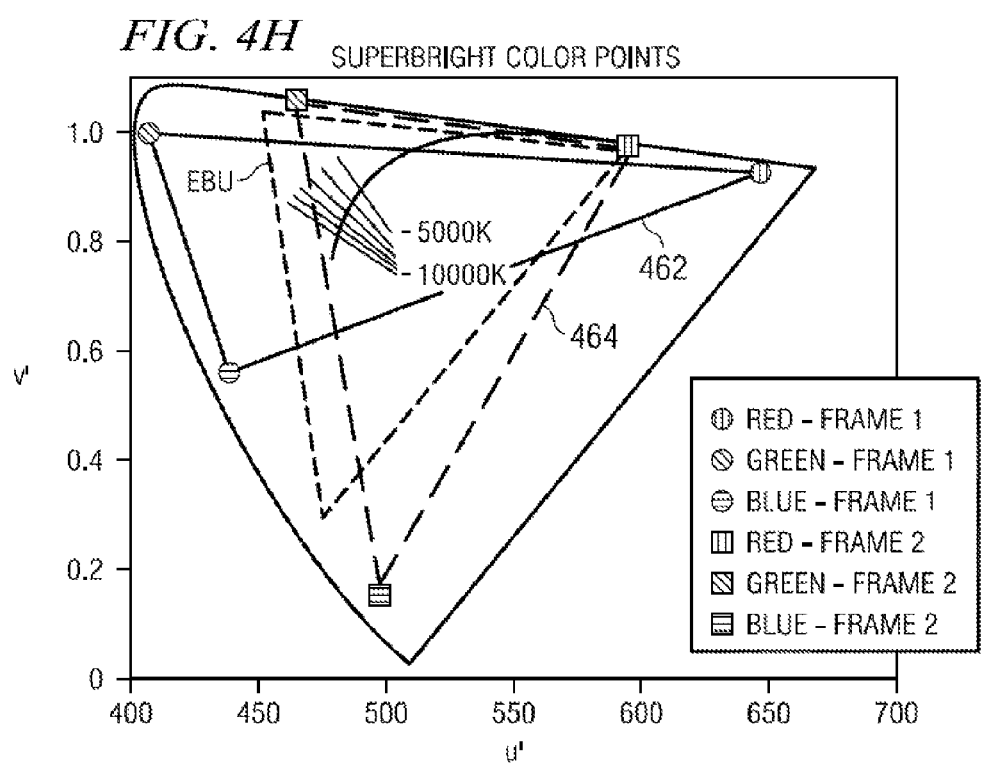

MULTI-FUNCTIONAL ACTIVE MATRIX LIQUID CRYSTAL DISPLAYS

CROSS REFERENCE TO RELATED APPLICATIONS

This is a continuation application of and claims priority to U.S. patent application Ser. No. 11/673,556, entitled "Multi-functional active matrix liquid crystal displays," filed Feb. 9, 2007 which claims priority to U.S. provisional patent application No. 60/772,251, entitled "Spectral division stereo display," filed Feb. 10, 2006, and also claims priority to U.S. provisional patent application No. 60/744,100, entitled "Multi-functional active matrix liquid crystal displays, filed Mar. 31, 2006, all of which are incorporated by reference herein.

TECHNICAL FIELD

Disclosed embodiments herein relate generally to direct-view liquid crystal displays (LCDs), and more particularly, to architectures and techniques for achieving improved performance, new applications, and eyewear therefor.

BACKGROUND

Advances in active matrix liquid crystal display (AMLCD) performance, particularly in television and gaming displays have been achieved by new backlight technology and LCD display driving techniques. For instance, LEDs with improved RGB spectra have shown better gamut/efficiency over displays using conventional cold cathode fluorescent lamps (CCFL).

Multi-primary displays (displays with four or more primary monochromatic light sources) have been demonstrated on several platforms, including projection displays and direct-view AMLCDs. For the former, Jorke teaches a split-path system with a six-primary display using a dual-projector configuration in U.S. Pat. No. 6,698,890. This approach is also used to provide stereo display. Typically, such projection systems are considerably more hardware intensive and compromise the performance (e.g., brightness) attainable with a conventional three-panel projection system.

Lamp-based six-color AMLCDs have also been demonstrated using the hybrid spatial-sequential method. However, gamut enhancement is relatively modest due to the challenges of tailoring the individual lamp emission spectra. In some cases, (non-sequential) enhanced gamut is obtained by simply combining CCFLs with different emission spectra.

There have been demonstrations of 3D using wavelength separation as a means of presenting stereo imagery with a single display. So-called anaglyph displays present the two image views by partitioning the spectrum. Typically, lenses of non-overlapping complementary color (e.g., red and cyan) are used. However, the lack of wavelength selectivity of traditional low-cost (dye) filter technology has prohibited the presentation of full-color information to each eye.

Another anaglyph approach involves filtering of light with greater selectivity, such that non-overlapping spectra presented to each eye provide improved perception of color. In one instance, substantially full color is presented to one eye, with the other receiving a monochrome image. Another technique of multiplexing involves presentation of non-overlapping RGB content to each eye, as taught by Jorke.

SUMMARY

High resolution large screen televisions and flat-screen computer monitors are successfully displacing CRT technology throughout much of the world. The next advancements in display performance will enable yet another level of performance and functionality. In the case of large screen active matrix LCD (AMLCD), technology trends are governed by the requirement of meeting, and even exceeding, the performance achievable with plasma display technology.

The present disclosure provides a direct view display that may operate under one or more modes of operation including (1) an advanced 2D mode, (2) an enhanced color gamut mode using six primary spectral emitters, (3) a privacy screen mode, (4) a dual-image (or channel multiplexed) mode, and (5) a stereoscopic image mode.

Furthermore, the direct view displays of the present disclosure may overcome performance deficiencies that hamper competitiveness of conventional AMLCD products. In the context of direct-view AMLCD displays, these issues include: (a) motion artifacts due to the image-hold function of the light modulating panel; (b) limited view angle performance; (c) head-on contrast ratio; (d) limited color gamut due to the quality of dyes in color filter arrays, coupled with CCFL lamp spectra, (e) non-optimum power efficiency, due to non-optimum spectrum of CCFL lamps, and (f) environmental concerns regarding mercury in CCFL lamps. Embodiments described herein may address one or more of these performance issues while also providing one or more multi-functional modes. LED backlights may prove beneficial in addressing these issues, as well as gamut enhancement, improved light efficiency, improved contrast, content-dependent dimming, active color temperature control, and sequential color operation.

In a described embodiment, in addition to providing a suitable adjustment in image content, the transition from advanced 2D display to 6-primary display may be provided by doubling of frame rate and a modification to LED driving sequence. A further transition from 6-primary display to stereo display may be provided by a suitable adjustment in image content, and an appropriate set of spectral separation eyewear. The latter selects the appropriate image for transmission to each eye. A further transition from stereo-display to privacy screen display may be provided by a suitable adjustment in image content, and an appropriate set of spectral separation eyewear. The latter selects one of two related images for transmission by both lenses.

According to an aspect of the disclosure, a direct view display includes a backlight and a light modulating panel operable to modulate the light from the backlight. The backlight includes a first and second set of spectral emitters operable to generate light. The first set of spectral emitters includes a first spectral emitter selected from a pair of long band spectral emitters (R1, R2), a second spectral emitter selected from a pair of middle band spectral emitters (G1, G2), and a third spectral emitter selected from a pair of short band spectral emitters (B1, B2). The second set of spectral emitters includes fourth, fifth, and sixth spectral emitters comprising a complementary selection of spectral emitters to those selected for the first set of spectral emitters.

In accordance with another aspect of the disclosure, a backlight includes a first and second set of spectral emitters operable to generate light. The first set of spectral emitters include a first spectral emitter selected from a pair of long band spectral emitters (R1, R2), a second spectral emitter selected from a pair of middle band spectral emitters (G1, G2), and a third spectral emitter selected from a pair of short band spectral emitters (B1, B2). The second set of spectral emitters includes fourth, fifth, and sixth spectral emitters comprising a complementary selection of spectral emitters to those selected for the first set of spectral emitters. In accordance with this aspect, the R1 and R2 narrow transmission ranges lie substantially within the sensitive wavelengths of the L-cone receptors in a human eye, wherein the G1 and G2 narrow transmission ranges lie substantially within the sensitive wavelengths of the M-cone receptors in the human eye, and wherein the B1 and B2 narrow transmission ranges lie substantially within the sensitive wavelengths of the S-cone receptors in the human eye.

According to another aspect of the disclosure, a method for displaying images on a direct-view display includes generating a first light bundle from a direct-view display backlight using a first set of spectral emitters, and generating a second light bundle from the direct-view display backlight using a second set of spectral emitters. The first set of spectral emitters includes a first spectral emitter selected from a pair of long band spectral emitters (R1, R2), a second spectral emitter selected from a pair of middle band spectral emitters (G1, G2), and a third spectral emitter selected from a pair of short band spectral emitters (B1, B2). The second set of spectral emitters includes fourth, fifth, and sixth spectral emitters comprising a complementary selection of spectral emitters to those selected for the first set of spectral emitters.

Another aspect of the disclosure presents a method for displaying a dual-image representation on a direct view display, whereby the direct view display includes a backlight having a first and second set of spectral emitters, and a light modulating panel. The method includes temporally alternating illumination between the first set of spectral emitters and the second set of spectral emitters on a portion of the light modulating panel. The first set of spectral emitters do not provide illumination to the portion of the light modulating panel when the second set of spectral emitters are illuminating thereon. Further, the second set of spectral emitters do not provide illumination to the portion of the light modulating panel when the first set of spectral emitters are illuminating thereon.

Yet another aspect of the disclosure presents a method for displaying an image in a direct-view display, whereby the direct-view display has a backlight with first and second sets of spectral emitters operable to illuminate more than one illumination region, and the direct-view display further has a light modulating panel located between the backlight and a viewing position. The method includes deactivating first and second set spectral emitters in a first illumination region associated with a first region of a light modulating panel. The method also includes configuring at least one pixel in the first region of the light modulating panel. Further, the method includes activating illumination of at least one set of first and second set spectral emitters in the first illumination region. Also included in the method is the deactivating of first and second set spectral emitters in a second illumination region associated with a second region of a light modulating panel. Additionally, the method includes configuring at least one pixel in the second region of the light modulating panel; and activating illumination of at least one set of first and second set spectral emitters in the second illumination region.

Examples of architectures and techniques are disclosed herein, but other architectures and techniques can be used without departing from the spirit and scope of the present disclosure.

BRIEF DESCRIPTION OF THE DRAWINGS

Embodiments are illustrated by way of example in the accompanying figures, in which like reference numbers indicate similar parts, and in which:

FIG. 4G is a graph showing the resulting six primary color spectra of FIG. 4F, given as the product of a particular white input spectrum with each of the Color Filter Array spectra in accordance with the present disclosure;

FIG. 4H is an EBU graph showing first and second light output sets corresponding to the spectral emitters referenced in FIG. 4G, as defined by first and second RGB triangles in a modified color space (u', v') in accordance with the present disclosure;

DETAILED DESCRIPTION

Figure 1:
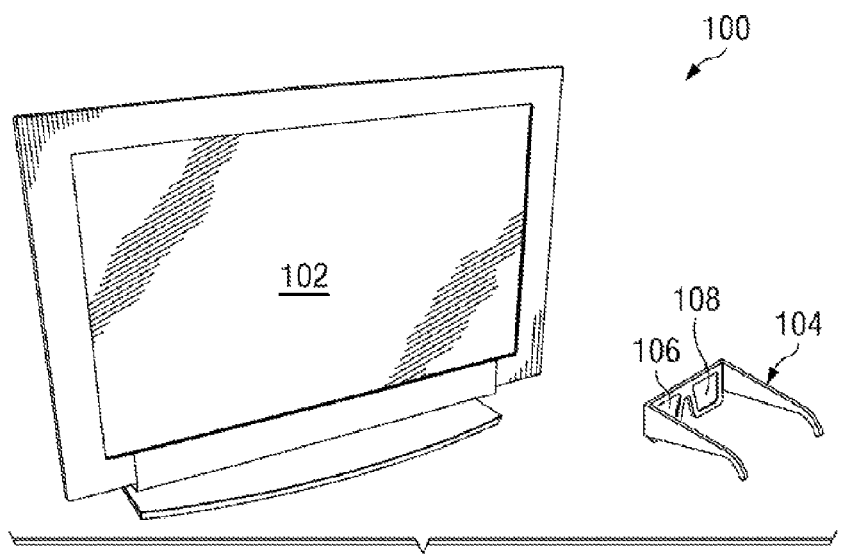
FIG. 1 is a schematic diagram illustrating an exemplary direct-view display system in accordance with the present disclosure.

FIG. 1 is a schematic diagram illustrating an exemplary direct-view display system 100. The direct-view display system 100 includes a direct view display 102 and, for viewing some modes, eyewear 104. Eyewear 104 includes left eye and right eye filters 106, 108 respectively. Left and right eye filters 106, 108 may include retarder stacks for decoding first and second light bundles emitted from the direct view display 102.

The direct view display 102 may operate under several modes of operation including (1) an advanced 2D mode, (2) an enhanced color gamut mode using six primary spectral emitters, (3) a privacy screen mode, (4) a dual-image (or channel multiplexed) mode, and (5) a stereoscopic image mode. In the enhanced color gamut mode, eyewear 104 is not needed. In modes two through four, eyewear 104 may be used to decode an image on the direct-view display 102. As will be appreciated with reference to the following description, filters 106, 108 may have different configurations to decode images in accordance with a mode of operation.

Figure 2:
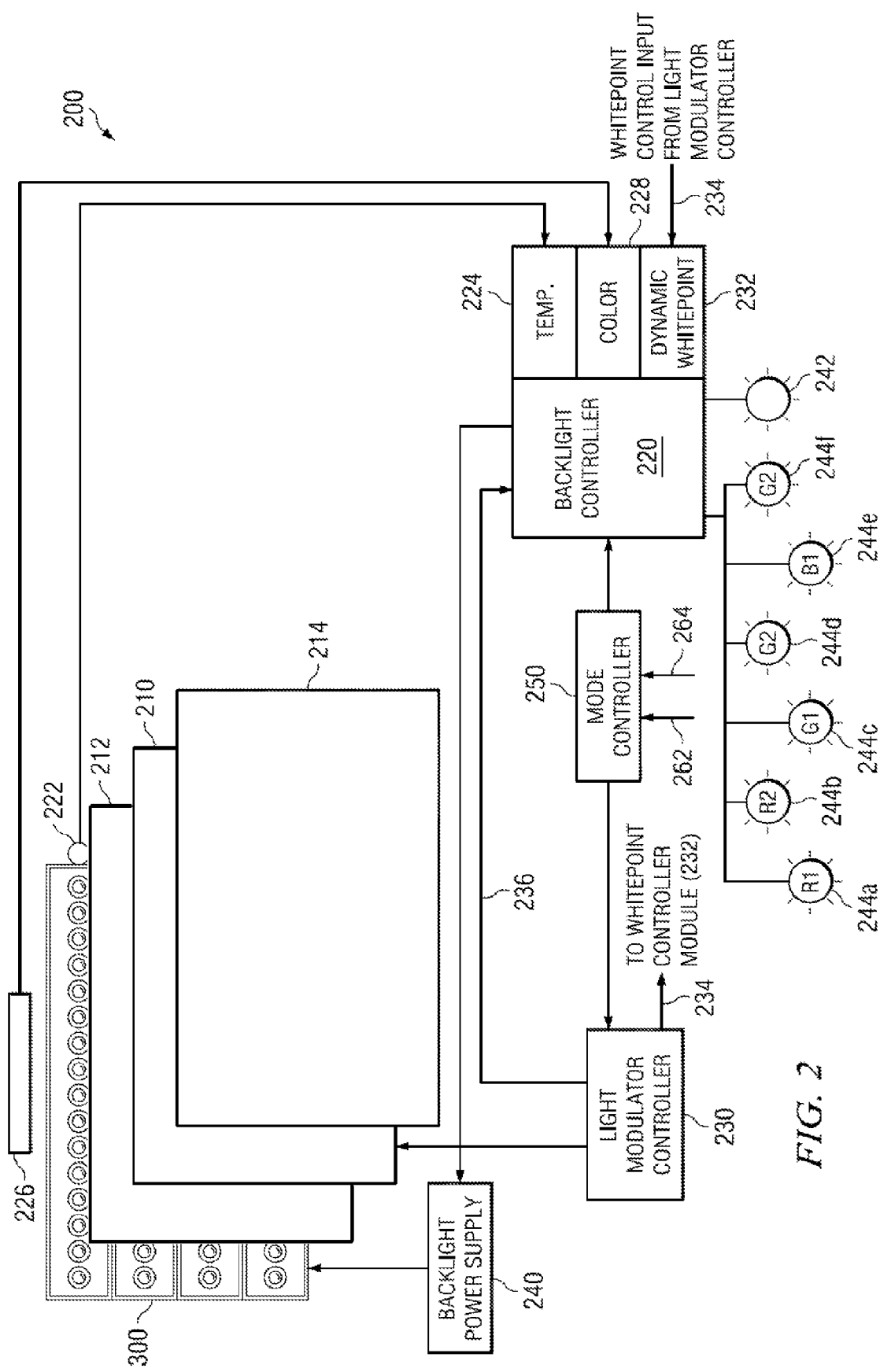
FIG. 2 is a schematic diagram illustrating an exemplary direct-view display system in accordance with the present disclosure.

FIG. 2 is a schematic diagram illustrating an exemplary direct-view display 200. The direct-view display 200 includes a backlight 300, a light modulating panel 210, a backlight controller 220, a light modulator controller 230, a backlight power supply 240, and a mode controller 250.

When partitioning the spectrum, display performance metrics may include the white point (and matching of white point between first and second sets of spectral emitters), the color gamut (and matching of color coordinates between first and second sets of spectral emitters), and the lumens available from the first and second sets of spectral emitters. Such display performance involves complex analysis, that may include visual perception, hardware for display imagery, the actual content, and software corrections to improve matching between the output for the first and second sets of spectral emitters. Accordingly, temperature control of the backlight 300 may be provided via temperature sensor 222 coupled to temperature feedback module 224. Whitepoint, brightness and color control parameters may be managed by backlight controller 220, which includes feedback for such parameters via color sensor 226 and optical feedback module 228. Backlight controller 220 may provide control signals to backlight power supply 240, which provides current to spectral emitters in backlight 300. Brightness control 242 and respective color controls 244a-f may also provide an input to backlight controller 220 for adjustment of display brightness and respective color intensity. Whitepoint control input may be received by whitepoint controller module 232 over line 234 from light modulator controller 230. Backlight control input may be received by backlight controller module 220 over line 236 from light modulator controller 230.

In this exemplary embodiment, mode selection is controlled via mode controller 250, which may switch first and second input video signals 262, 264 and provide signals to the light modulator controller 230 and backlight controller 220 in accordance with the selected mode. For example, in the advanced 2D mode and the enhanced color gamut mode, a single video signal is input to the mode controller 250. In channel multiplexed mode and the stereoscopic image mode, two video signals 262, 264 are input to the direct view display 200. In the privacy screen mode, a single video signal 262 may be input into the direct view display for a first image, while the second image is synthesized by an image generating function in the mode controller 250. Image processing functions may be performed by mode controller 250 and/or light modulator controller 230. As shown, entrance polarizer 212 and exit polarizer 214 may be located on either side of light modulating panel 210, respectively. Thus, direct-view display 200 outputs polarized light to a viewer.

Figure 3:
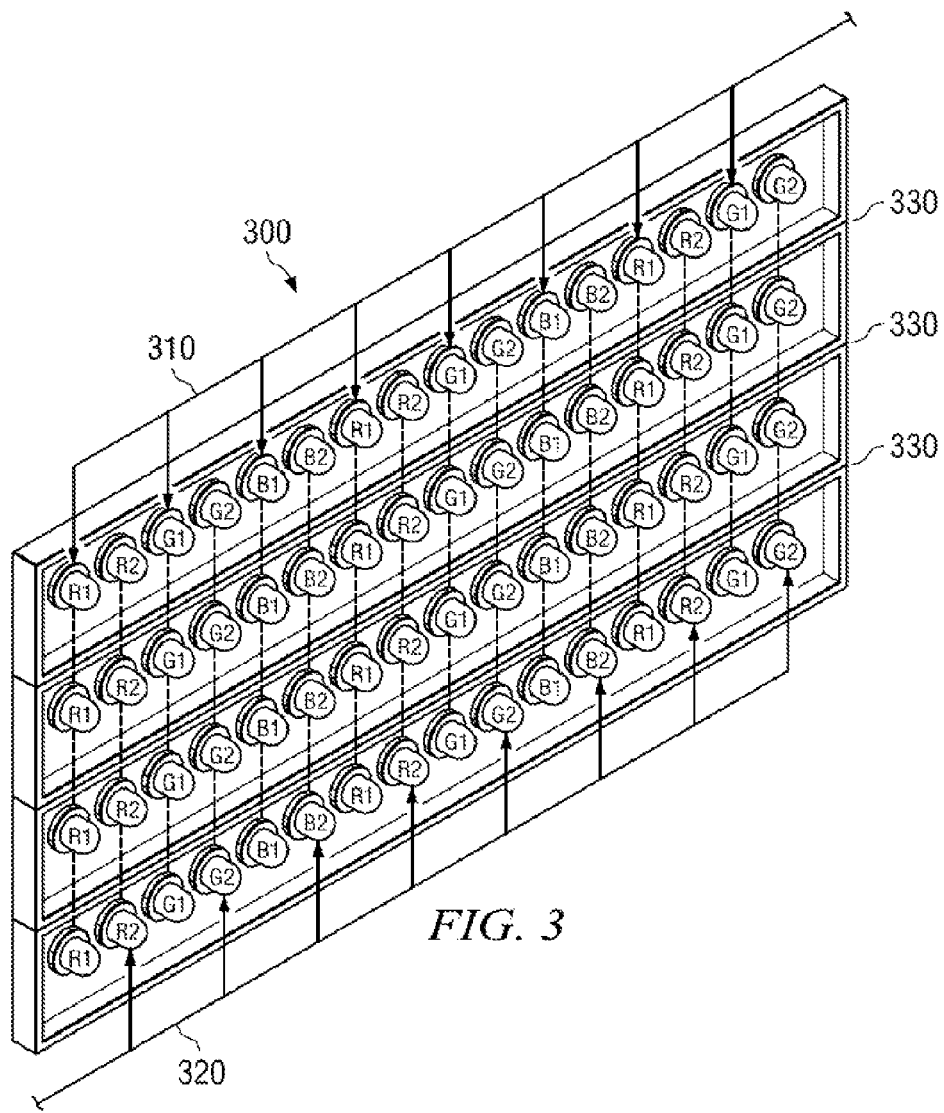
FIG. 3 is a schematic diagram illustrating an exemplary embodiment of an LED-based scanning backlight in accordance with the present disclosure.

FIG. 3 is a schematic diagram illustrating an exemplary embodiment of LED-based scanning backlight 300. Backlight 300 includes a first set of spectral emitters 310 and a second set of spectral emitters 320. As shown by this exemplary embodiment, optically separated sub-arrays may be formed using boundary structures 330.

In an embodiment, the first set of spectral emitters 310 are operable to output narrow transmission ranges R1, G1, B1; and the second set of spectral emitters 320 are operable to output narrow transmission ranges R2, G2, B2. As shown, the spectral emitters may be arranged in rows, with columns alternating between first and second set emitters 310, 320 (e.g., in the sequence R1, R2, G1, G2, B1, B2, . . . , R1, R2, G1, G2, B1, B2), however, it should be apparent that alternative sequences and physical configurations of spectral emitters may be employed in other embodiments. Care should be taken to control homogeneity in illumination in the vicinity of the boundary structures 330. Uniform brightness and hue depend upon the extent of any physical gap between sub-arrays, the matching of LED luminance and chrominance in the sub-arrays, and the timing in the driving of the sub-arrays.

The ability of the human eye to distinguish colors is based upon the varying sensitivity of different cells in the retina to light of different wavelengths. The retina contains three types of color receptor cells, or cones. One type, relatively distinct from the other two, is most responsive to light that we perceive as violet, with wavelengths around 420 nm. (Cones of this type are sometimes called short-wavelength cones, or S cones). The other two types are closely related genetically and chemically. One of them (sometimes called long-wavelength cones, or L cones) is most sensitive to light we perceive as yellowish-green, with wavelengths around 564 nm; the other type (sometimes called middle-wavelength cones, or M cones) is most sensitive to light perceived as green, with wavelengths around 534 nm.

Figure 9:
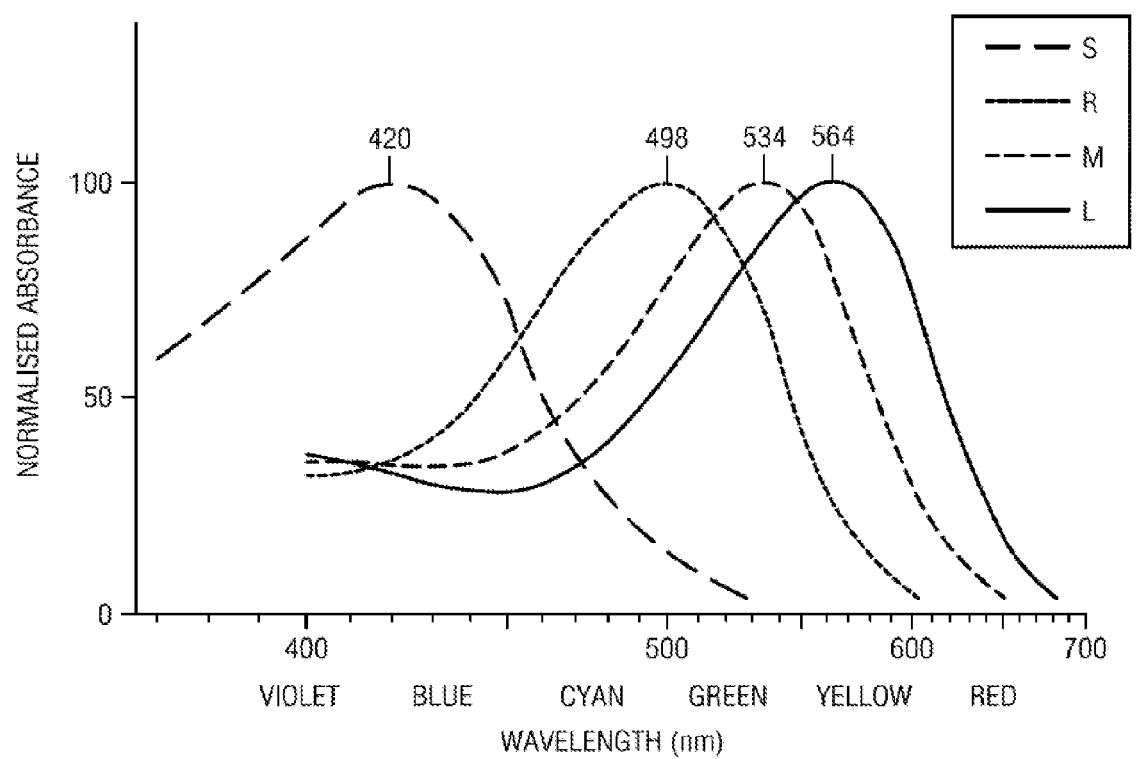
FIG. 9 is a graph showing tristimulus curves describing the spectral sensitivity of three retinal sensors in a typical eye.

Light, no matter how complex its composition of wavelengths, is reduced to three color components by the eye. For each location in the visual field, the three types of cones yield three signals based on the extent to which each is stimulated. These values are called tristimulus values. The response curve as a function of wavelength for each type of cone is illustrated in FIG. 9. Because the curves overlap, some tristimulus values do not occur for any incoming light combination. For example, it is not possible to stimulate only the mid-wavelength/"green" cones; the other cones will inevitably be stimulated to some degree at the same time. The set of all possible tristimulus values determines the human color space. It has been estimated that humans can distinguish roughly 10 million different colors.

Generally, the R1 and R2 narrow transmission ranges lie substantially within the sensitive wavelengths of the L-cone receptors in a human eye (as illustrated by FIG. 9); the G1 and G2 narrow transmission ranges lie substantially within the sensitive wavelengths of the M-cone receptors in the human eye; and the B1 and B2 narrow transmission ranges lie substantially within the sensitive wavelengths of the S-cone receptors in the human eye. As used herein, the term "transmission ranges" refers to the output spectra from a spectral emitter, whether direct or as a product of a spectral emitter through a color filter array.

Figure 4A:
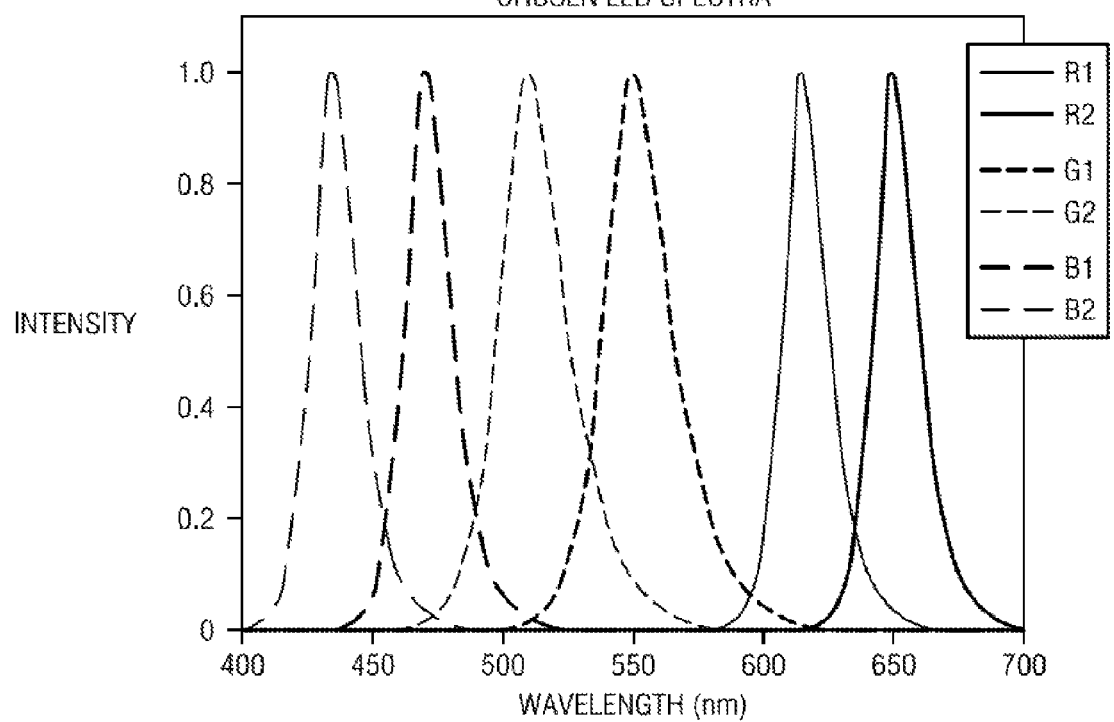
FIG. 4A is a graph showing intensity against wavelength for exemplary first and second sets of spectral emitters in accordance with the present disclosure.

FIG. 4A is a graph showing intensity against wavelength for exemplary first and second sets of spectral emitters. The LED spectra for the first and second sets of spectral emitters (R1, R2, G1, G2, B1, B2) are scaled to unity peak emission.

The center wavelengths are selected so as to provide a high degree of spectral separation, thereby enabling the disclosed modes of operation with little loss of light in the partitioning process. Such separation is also beneficial in maximizing the gamut area for the enhanced color gamut mode as well.

Figure 4B:
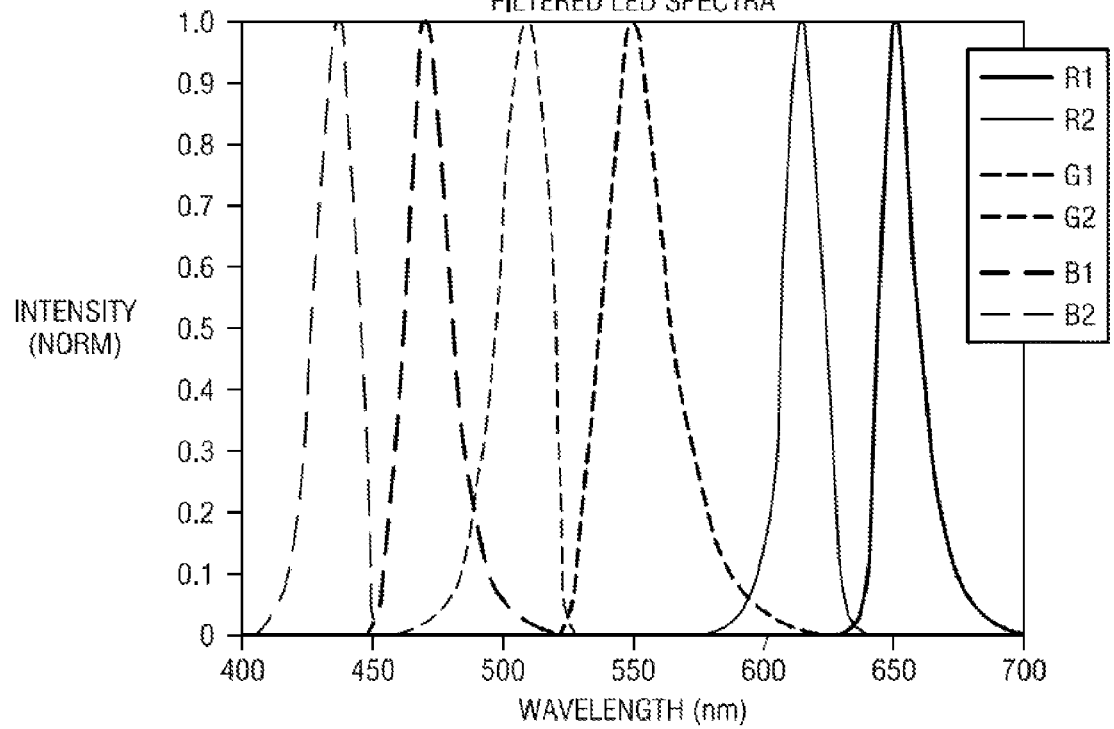
FIG. 4B is a graph showing intensity against wavelength for filtered first and second sets of spectral emitters in accordance with the present disclosure.

FIG. 4B is a graph showing intensity against wavelength for filtered first and second sets of spectral emitters. In this exemplary embodiment, the first set narrow transmission ranges (R1, G1, B1) are substantially non-overlapping with the second set narrow transmission ranges (R2, G2, B2). As used herein, the term "substantially non-overlapping" refers to most of the spectral emission being independent of an adjacent emission from another spectral emitter, such that cross talk between channels is preferably minimized. It should be appreciated by a person of ordinary skill in the art that using some off-the-shelf non-ideal spectral emitter technology, some spectral overlap may be present, for instance between channels B1 and G2, and channels G1 and R2, as shown by FIG. 4B. However, care should be taken in selection of spectral emitters (and in some embodiments, spectral filters) to minimize such cross-talk between spectral emitter channels. By careful selection of center wavelengths for spectral emitters, optimized color coordinates with enhanced gamut may be obtained. It will be appreciated that other types of spectral emitters such as lasers and super resonant LEDs have a narrower transmission range than typical LED structures, thus will be less likely to have spectral ranges that 'overlap.' With sufficient "non-overlapping" wavelength separation, the demands placed on the eyewear 104 for efficient separation of imagery of first and second spectral light sets may be relaxed. This can be contrasted with conventional UHP lamp spectra, which may use significant auxiliary filtering to accomplish similar performance, representing additional cost, and loss in light efficiency.

As shown in FIG. 4B, notches ideally exist both between short/long primary emission bands (i.e., B2/B1, G2/G1, R2/R1), as well as emission bands of the other primary colors. This separation is preferably maximized, with the understanding that the color coordinates should be acceptable and remain within a reasonable photopic sensitivity range (e.g., the short blue emission B2>430 nm; the long red emission R1<660 nm) for efficiency reasons. Such separation may accomplished directly, though additional filtering that may be incorporated into the spectral emitter (i.e., LED) package to provide adequate color performance of the display. This may include filters that eliminate reject light, or filters incorporated into the emitting structure (e.g., Bragg reflectors) that redirect light back to the light generating medium. This filtering may have little influence on efficiency, provided that the main emission lobe is substantially captured, and only the tail of the emission is attenuated. The tail can be relatively broad, and while it contains relatively little power, it can have significant impact on ghost images when operating in stereo mode. Such tail emission contributes directly to cross-talk and is independent of the performance of the eyewear 104. This is because it occurs at wavelengths at which the eyewear transmission should be high to ensure efficient transmission of the corresponding image.

Figure 4C:
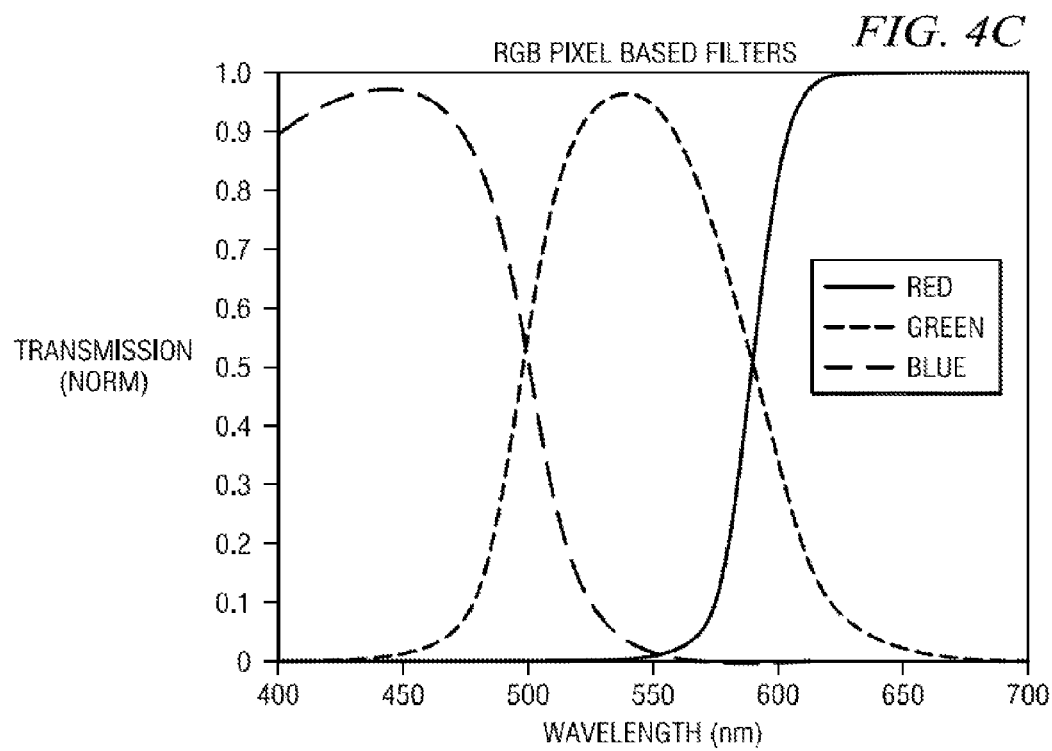
FIG. 4C is a graph showing exemplary scaled spectra for an RGB color filter array incorporated into a light modulating panel in accordance with the present disclosure.

FIG. 4C is a graph showing exemplary scaled spectra for an RGB color filter array incorporated into a light modulating panel. Each profile preferably provides high throughput to the corresponding set of LED (or other spectral emitter) emission bands (e.g., R1R2), while simultaneously providing high density blocking of the remaining four primaries (e.g., G1G2B1B2) to maximize saturation. When operated in the enhanced color gamut mode, the product of a CFA spectrum, with the corresponding set of emission bands preferably provides an acceptable color coordinate, while simultaneously providing high throughput. Moreover, the transition slope and stop-band blocking density are sufficient that leakage of the remaining four primary emission bands does not unacceptably desaturate the color coordinate. In one disclosed embodiment, referring back to FIG. 4C, the color filter array spectra are tailored to the specific center wavelengths of the spectral emitter emission bands. For instance, an AMLCD illuminated by a particular set of R1G1B1 primaries, produces greatest saturation of, say, B1, when the blue filter of the color filter array (CFA) provides high optical density absorption of the remaining R1G1 emission. Similarly, the greatest saturation of G1 occurs when the green filter of the CFA provides high optical density absorption of the remaining (R1B1) emission, and so on. When the alternate set of primary bands is displayed, a similar argument applies.

Since dye filters typically used for the CFA have limited transition slopes (as well as blocking density versus throughput), the careful selection of center wavelengths of the primary bands are important to the saturation of the resulting color coordinates. Since six bands are packed into the same wavelength range, enjoying maximum gamut enhancement may be limited by the CFA spectral performance.

Figure 4D:
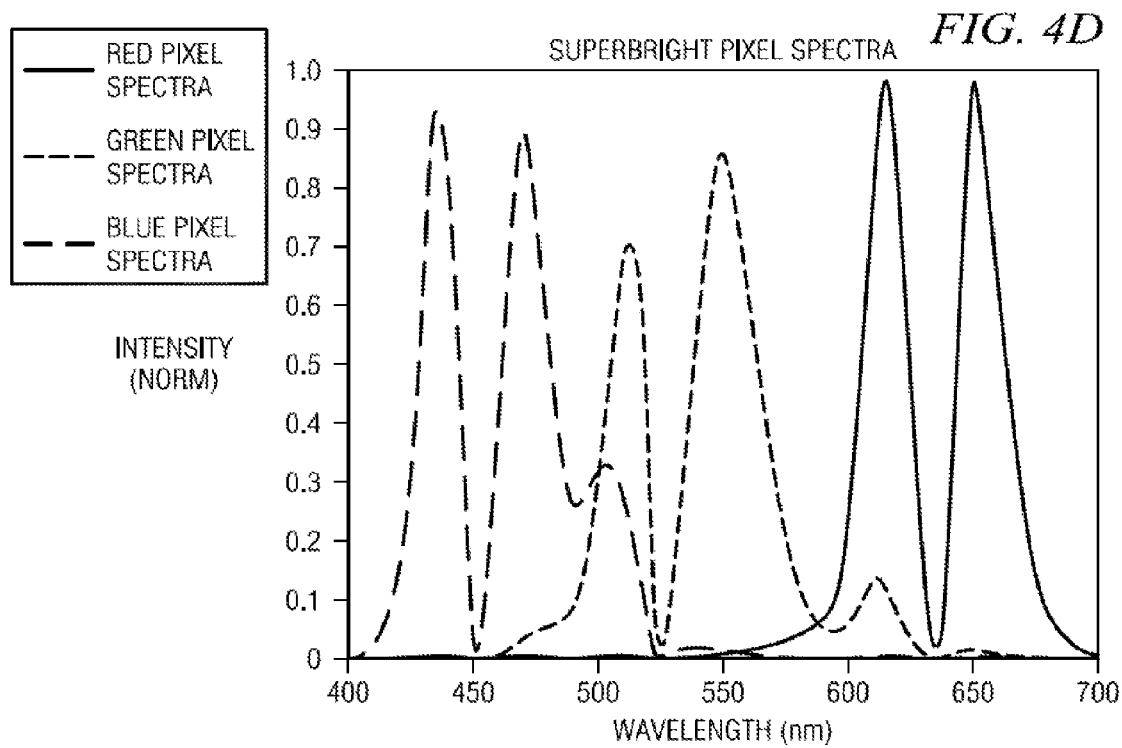
FIG. 4D is a graph showing spectra of first and second sets of spectral emitters through a color filter array in accordance with the present disclosure.
Figure 4E:
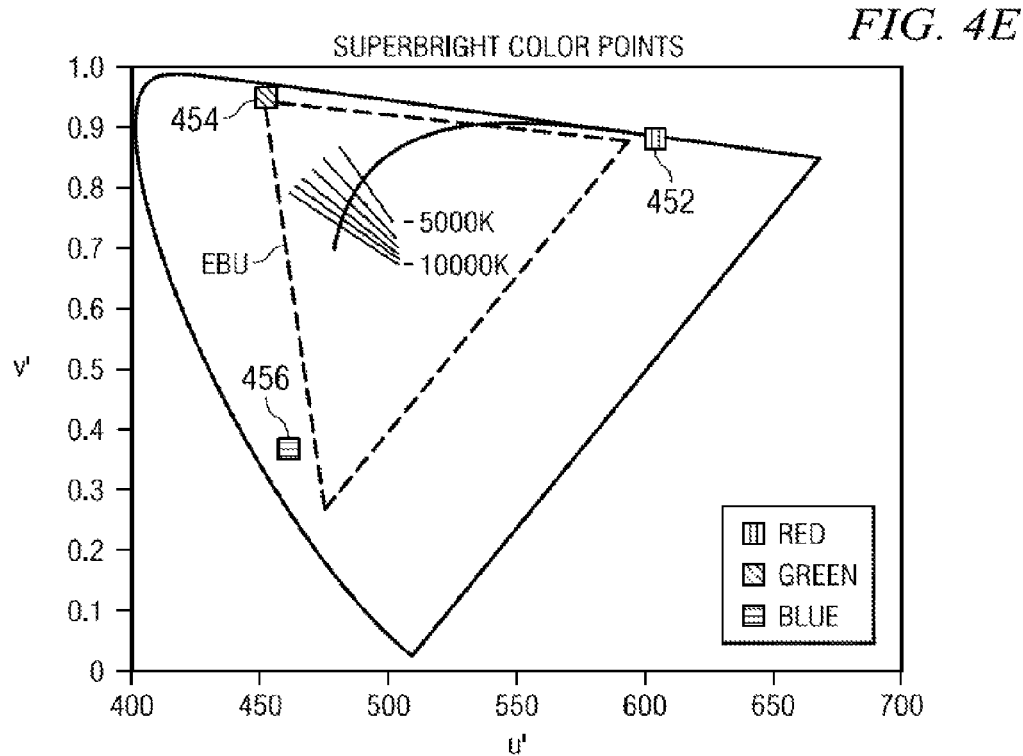
FIG. 4E is an EBU graph showing a light output set defined by an RGB triangle in a modified color space (u', v') in accordance with the present disclosure.

FIG. 4D is a graph showing spectra of first and second sets of spectral emitters through a color filter array. The corresponding color coordinates, are represented by points 452, 454, 456 in FIG. 4E, which is an EBU graph showing a light output set defined by an RGB triangle in a modified color space (u', v'). Some reduction in the short green (i.e., G2) emission may be warranted in order to further saturate the long blue primary (i.e., B1).

Figure 4F:
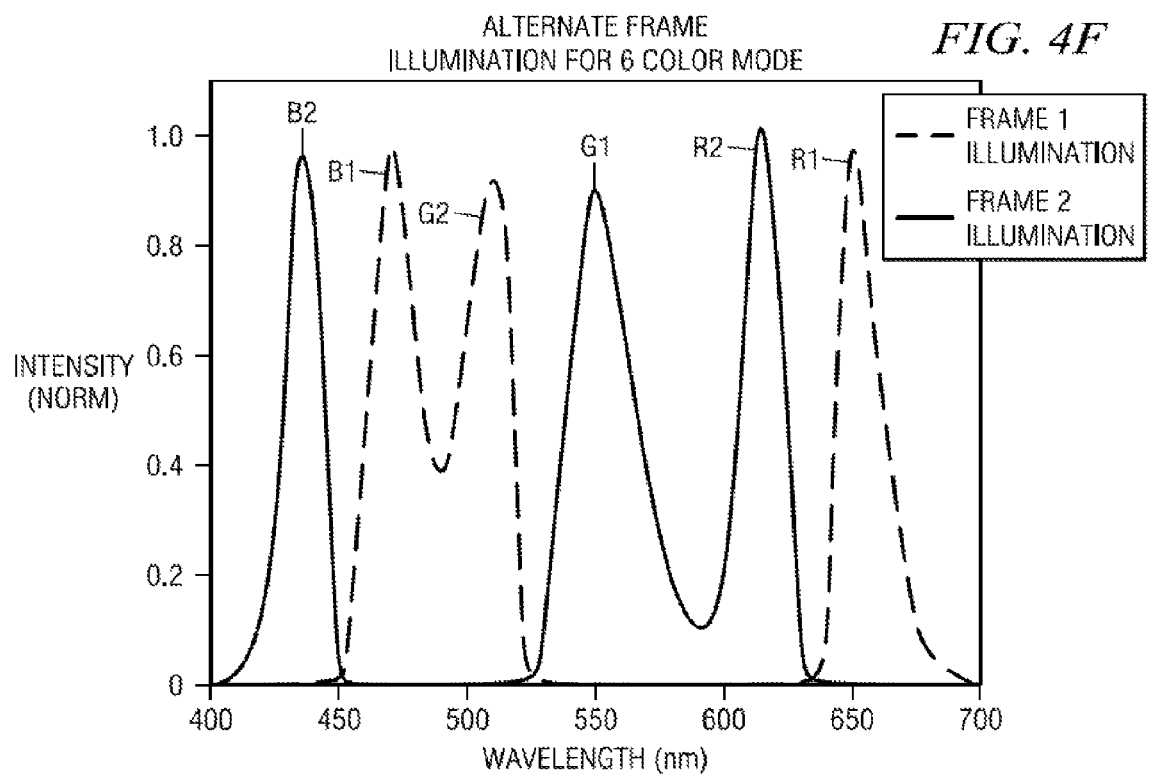
FIG. 4F is a graph showing intensity against wavelength for exemplary first and second sets of spectral emitters in accordance with the present disclosure.

Using six primary spectral emitters, there are four possible groupings of primary bands. For example, although the first spectral emitter set is described in an embodiment as R1G1B1, and the second spectral emitter set is described in an embodiment as R2G2B2, other combinations of spectral emitters are feasible. FIG. 4F shows another exemplary combination, corresponding to a first spectral emitter set (R2G1B2) and a second spectral emitter set (R1G2B1). This graph shows the sequential white illumination spectra that are input to the panel. Alternative groupings for spectral emitter sets include R1G1B2/R2G2B1 and R2G1B1/R1G2B2.

FIG. 4G shows the resulting six primary color spectra of FIG. 4F, given as the product of a particular white input spectrum with each of the Color Filter Array spectra (shown in FIG. 4C). The corresponding color coordinates are shown in FIG. 4H, which is an EBU graph showing first and second light output sets corresponding to the spectral emitters referenced in FIG. 4G, as defined by first and second RGB triangles in a modified color space (u', v'). Here, a first set of spectral emitters provides a first light bundle defined by a first RGB triangle 462 of an EBU color gamut diagram, and the second set of spectral emitters provide a second light bundle defined by a second RGB triangle 464 of the EBU color gamut diagram including colors outside the first RGB triangle, such that the enhanced display mode provides an enhanced color gamut to that produced by one light bundle.

In principle, a display operating at 120 Hz will produce a time-averaged output, so the actual grouping is not critical to performance. A time-averaged brightness and white point will result. Subtleties that can come into play include the details of the overlap of spectra in determining the saturation of the primaries. For instance, it may be preferable to group (B2G2) and (B1G1) in order to minimize the constraints on the CFA in separating the blue and green primaries. In addition, it may be beneficial to match the luminance of the white output spectra, in order to mitigate any flicker effects.

In principle, the grouping used to implement multi-primary display can differ from that used in stereo mode. It simply depends upon practical issues regarding flexibility incorporated into the backlight for individually addressing the LEDs.

Figure 4I:
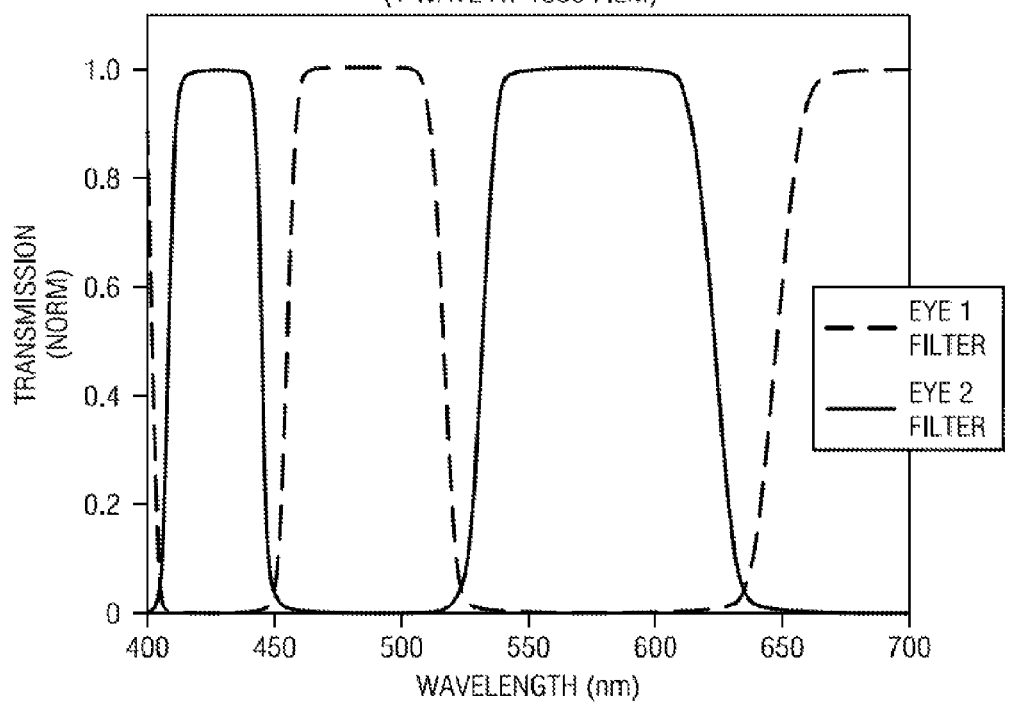
FIG. 4I is a graph illustrating exemplary transmission profiles for an embodiment including first and second polarization interference filters for viewing respective first and second images illuminated with respective first and second sets of spectral emitters in accordance with the present disclosure.

In stereo mode, substantially non-overlapping spectral filters are used to decode first and second images for left and right eyes respectively. FIG. 4I is a graph illustrating exemplary transmission profiles for an embodiment including first and second polarization interference filters for viewing respective first and second images illuminated with respective first and second sets of spectral emitters. An image for the left eye is provided via a retarder stack, with a first duty ratio, followed by an analyzing polarizer that is parallel to the LCD polarizer. An image for the right eye is provided via a retarder stack with a second duty ratio, followed by an analyzing polarizer that is crossed with the LCD polarizer. Note that the parallel/crossed arrangement, with identical film retardance used in each stack, ensures that the spectral overlap point is fixed by the relative duty ratio of the designs.

Figure 4J:
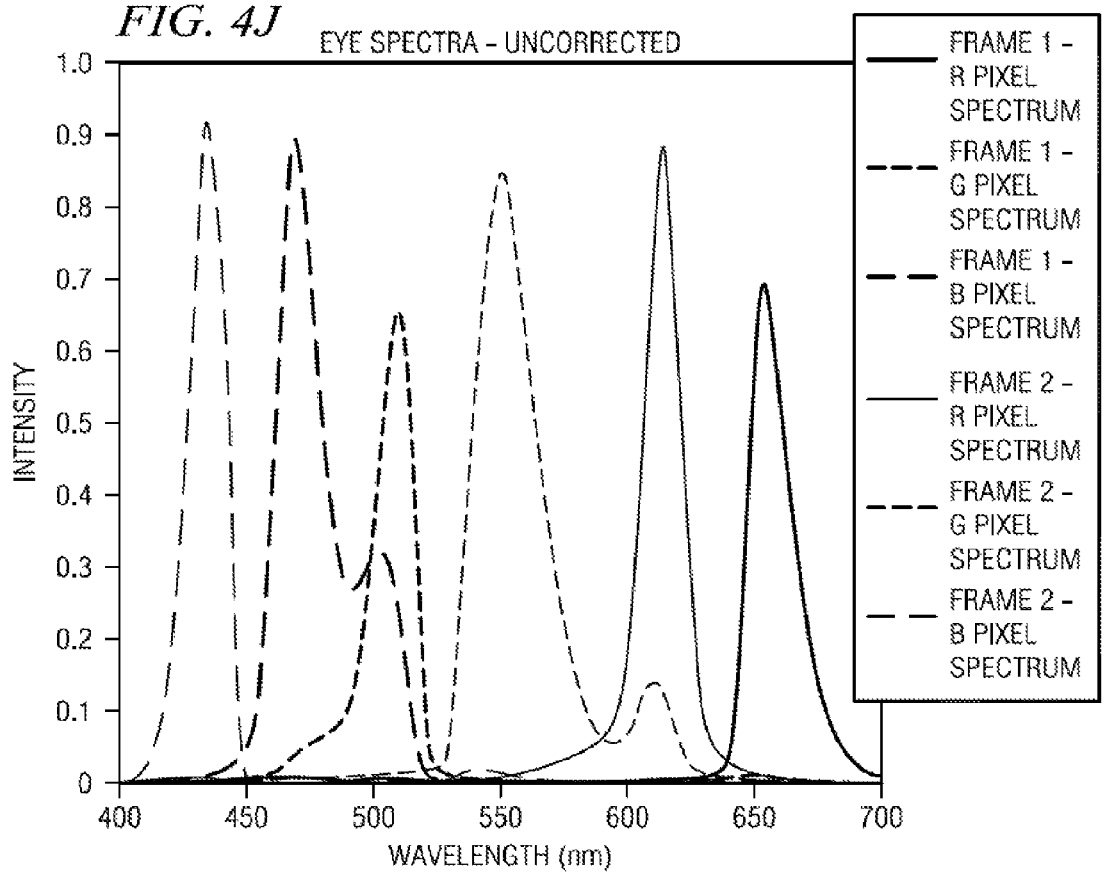
FIG. 4J is a graph showing raw spectra from the spectral emitters transmitted to each eye through the aforementioned polarization interference eyewear of FIG. 4I in accordance with the present disclosure.
Figure 4K:
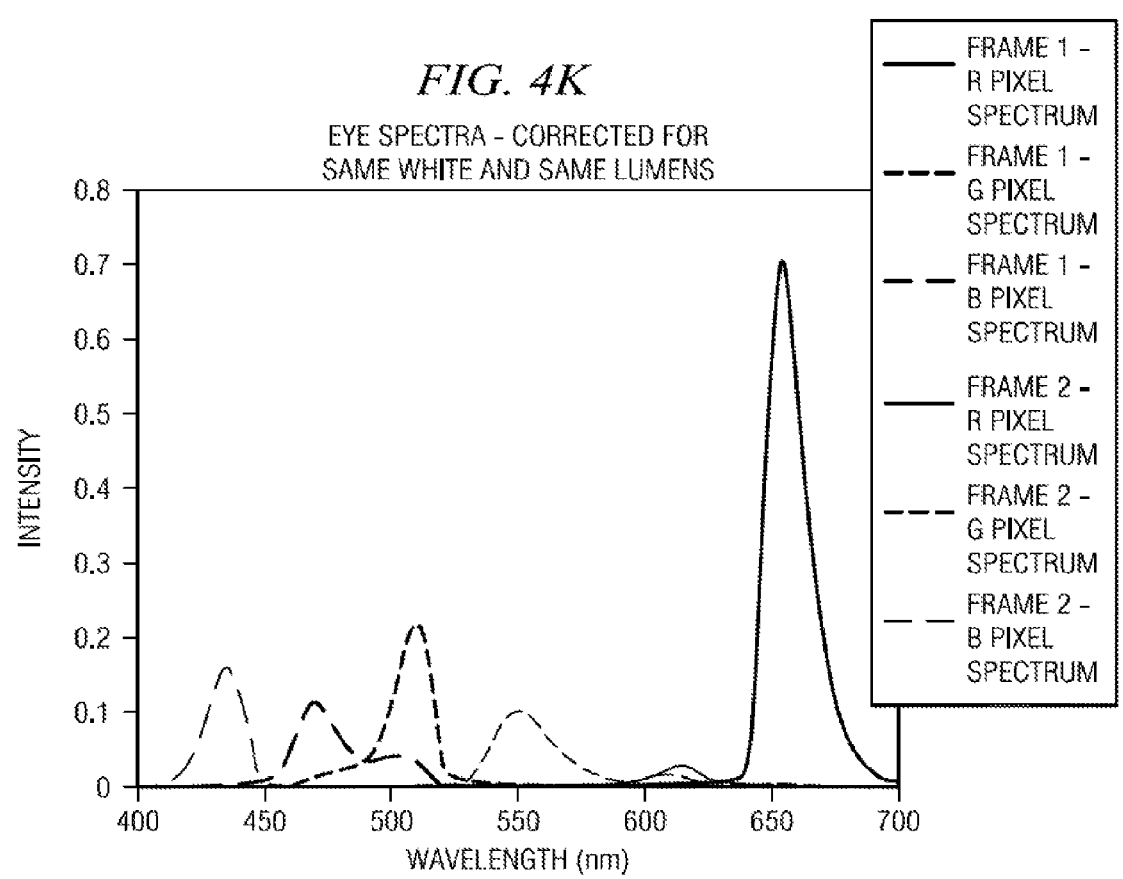
FIG. 4K is a graph showing a scaled version of the FIG. 4J spectra, adjusted to achieve balanced white lumens and color in each eye in accordance with the present disclosure.

FIG. 4J shows the raw spectra from the spectral emitters transmitted to each eye through the aforementioned polarization interference eyewear of FIG. 4I. FIG. 4K shows the scaled version of the FIG. 4J spectra, adjusted to achieve balanced white lumens and color in each eye. A technique for optimizing eyewear filter designs to achieve balanced white lumens and color in each eye involves maximizing net brightness after suitable color correction. Acceptable color corresponds to each eye seeing acceptable primary colors (RGB) with a corrected full white (D65). The brightest channel can then be attenuated to allow for matched left eye/right eye brightness. Under these conditions, each eye can be made to experience effectively the same primary color hues by selectively adding small proportions of two display primaries into an oversaturated third.

Figure 4L:
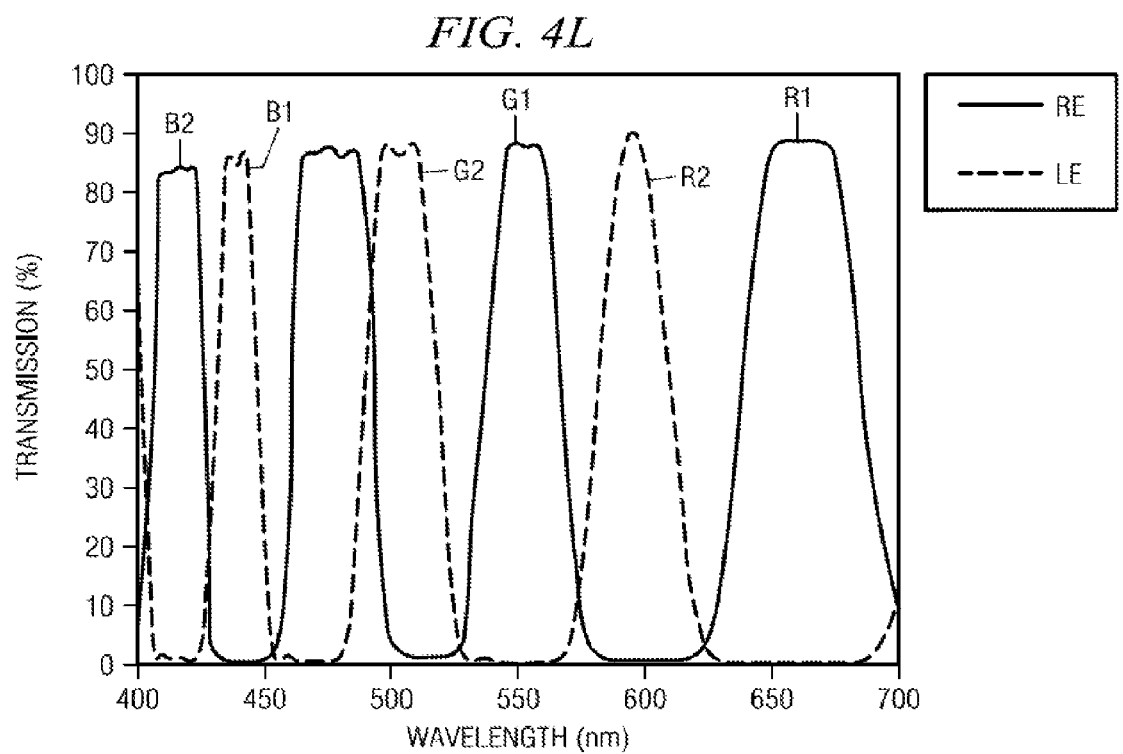
FIG. 4L is a graph illustrating exemplary transmission profiles for another embodiment including first and second polarization interference filters for viewing respective first and second images illuminated with respective first and second sets of spectral emitters in accordance with the present disclosure.

FIG. 4L is a graph illustrating exemplary transmission profiles for another embodiment including first and second polarization interference filters for viewing respective first and second images illuminated with respective first and second sets of spectral emitters. In this embodiment, a first filter's transmission spectrum allows a first light bundle (R1, G1,B2) to be transmitted, and a second filter's transmission spectrum allows a second light bundle (R2,G2,B1) to be transmitted. In accordance with the present disclosure, the first filter blocks the spectral frequencies of the second light bundle, and the second filter blocks the spectral frequencies of the first light bundle.

Types of Spectral Emitters

As mentioned earlier, various types of spectral emitters may be used to provide backlight illumination for a direct-view display in accordance with the present disclosure. While LEDs are described throughout as the spectral emitters used in the described embodiments, consistent with the present disclosure, other suitable spectral emitters may be used such as lasers and super resonant LEDs (or sub-threshold lasers). Such spectral emitters provide several benefits in implementing next-generation displays, including narrow spectral emission, rapid modulation, convenient packaging in sub-arrays, long lifetime—and being mercury free, they are more environmentally acceptable than CCFLs. The aforementioned spectral emitters provide operational advantages with regard to rapid modulation. Since the response time of an LED is mainly limited by the driver (typically microseconds), pulsing can be used to optimize power efficiency/thermal management, and manage temporal artifacts of the modulating panel. Other benefits, such as content-dependent dimming, and active color temperature control may be feasible due to the independence in electronic control of the synthesized spectrum. In addition, LEDs lend themselves to building sub-arrays or packaged clusters for implementing scanning-backlight systems, which advantageously provide minimized temporal artifacts. Further, the long lifetime typical of most LEDs, and their mercury free construction provide advantages over conventional CCFL technology. The above features provide initiative for a migration from Cold Cathode Fluorescent Lamps (CCFL) to backlight systems with spectral emitters (i.e., LEDs, super resonant LEDs, and lasers), particularly for high performance video.

Spectral emitters suitable for the above functions can take many forms. For example, organic light emitting diode (OLED) stripes can be patterned and or stacked on a substrate in a periodic fashion (e.g., R1,R2,G1,G2,B1,B2). In some embodiments, the spectral emitter sets 310, 320 may be directly optically coupled to the light modulating panel 202, while in other embodiments, the spectral emitter sets 310, 320 may be optically coupled to the light modulating panel 202 via optically transmissive components that include light guides, light pipes, fiber optics, reflectors, wave guides, et cetera. Such optically transmissive components may be plastic, glass, silica on silicon-based, or a combination thereof. Discrete LEDs can also be packaged in linear arrays mounted directly behind the panel, or coupled into light guides from one or more edges. Techniques for providing uniform illumination of the modulating panel are well known, using edge illumination and light guides, or arrays of LEDs mounted behind the panel.

Addressing Problems with Motion Artifacts in LCD Displays

The representation of motion has heretofore been an issue with conventional LCD displays. Contributing factors include, first, the response of typical LCD panels being too slow, and second, the hold-time effect of a display. With regard to the first factor, in conventional LCD displays, a TFT panel is addressed in a scrolling row-by-row fashion. Once an electric field is applied across the LC layer, several milliseconds are required for the LC material to reorient between states representing the gray level difference between consecutive images. During continuous illumination, a moving object can thus appear to have a poorly defined location during this transition, resulting in a perception of image smearing. One technique to reduce this motion artifact problem involves developing faster switching LC materials, alignment recipes and structures (e.g. multi-domain) and addressing schemes (e.g. overdrive).

It is known, however, that a hold-type display operating at 60 Hz will demonstrate perceived image blurring under any circumstances. At certain spatial frequencies, there is an almost complete loss in perceived contrast that occurs even when infinitely fast switching LC is assumed. To combat this problem, redesigns in the panel are underway in the industry to operate at 120 Hz. At such frequencies, alternate images may be inserted via on-the-fly interpolation between bracketing images. Such measures are difficult and expensive, but they also enable some multi-functional displays by allowing, for example, flicker-free stereo display.

Perceived blurring from the hold-type displays notwithstanding, faster LC switching is also desirable for reducing motion artifacts. Presently, panel response time has improved significantly, with 4 ms being fairly standard in high-end displays. This will undoubtedly improve incrementally over time. Such switching speed is also desirable for realizing multifunctional displays in accordance with the present disclosure.

Addressing the hold-time effect, other techniques that mitigate motion artifacts involve modulating the illumination. Sluyterman et al. teach the use of a CCFL with black frame insertion to reduce motion blurring. However, this technique using CCFLs introduces serious problems. While CCFLs can in principle be used to eliminate light loss/efficiency issues, another problem exists: Operation at 60 Hz with black frame insertion introduces flicker.

Considering the above-referenced limitations connected with finite LC switching, the scanning function using spectral emitters disclosed herein may be desirable to optimize the timing of illumination, such that the illumination follows the panel addressing. A scrolling black band can minimize, if not eliminate the appearance of before/after ghost images. Several individually addressable sub-arrays of LEDs (or alternative spectral emitters) can be used to create multiple illumination segments. In embodiments, for the purposes of timing optimization, a course grouping of sub-arrays (e.g., 3-10) may be used. Note that black band cycling at 60 Hz can also introduce some flicker.

Figure 5:
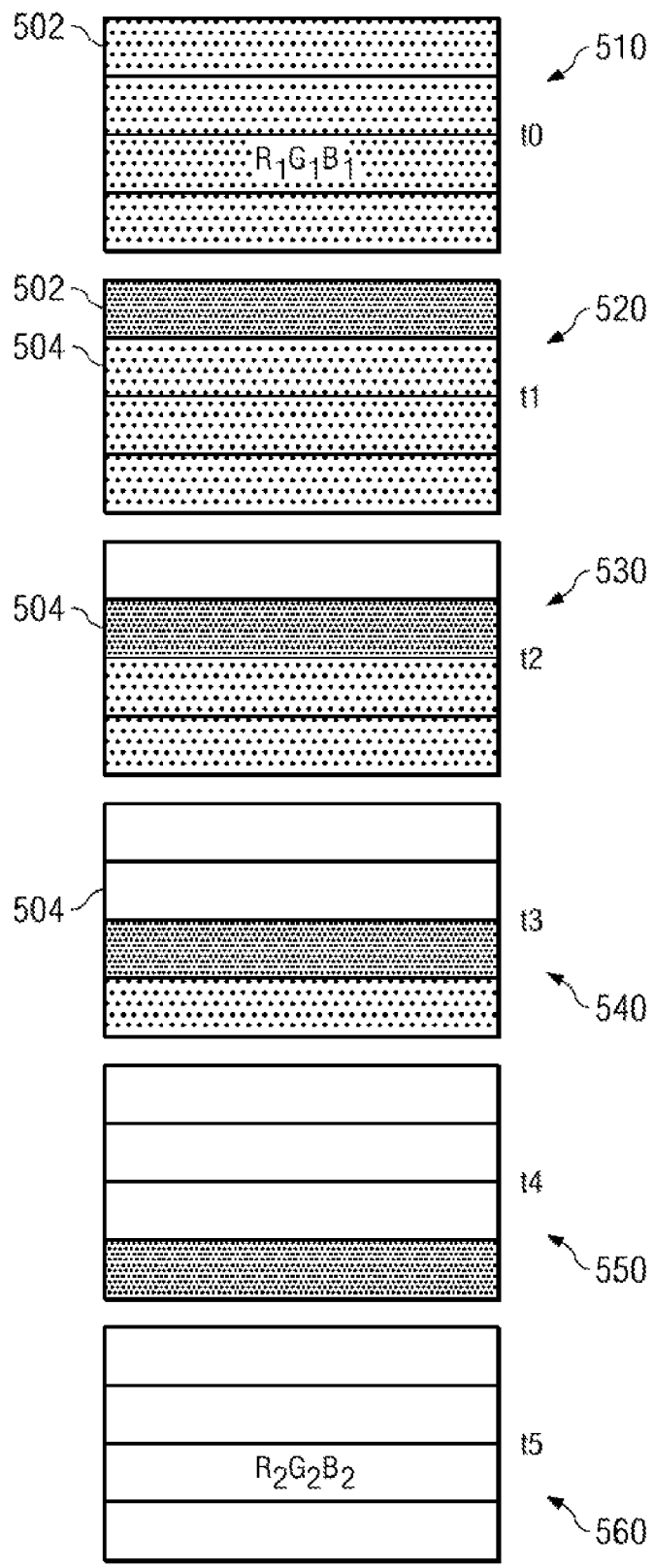
FIG. 5 is a schematic diagram illustrating an exemplary scanning backlight with black-band insertion in accordance with the present disclosure.

FIG. 5 is a schematic diagram illustrating an exemplary scanning backlight utilizing a black-band insertion technique. FIG. 5 illustrates a direct-view display at various stages in time cycles t0 through t5, represented by simplified display shots 510, 520, 530, 540, 550, 560 respectively.

Figure 6:
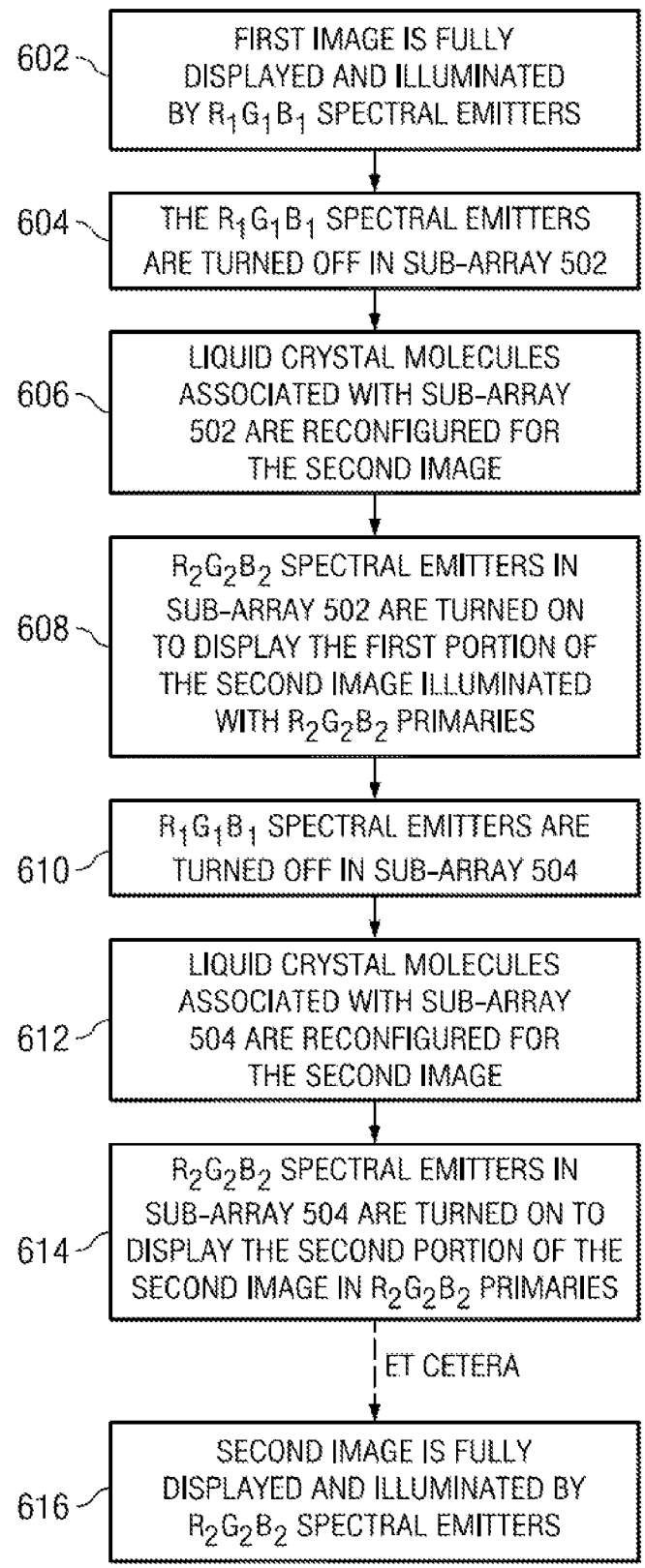
FIG. 6 is a logic diagram illustrating a process of black band insertion in conjunction with a scanning backlight, in accordance with the present disclosure.

FIG. 6 is a logic diagram illustrating a process of black band insertion in conjunction with the scanning backlight illustration of FIG. 5. At time t0, first image 510 is fully displayed and illuminated by $R_1G_1B_1$ spectral emitters, at step 602. At time t1, the $R_1G_1B_1$ spectral emitters are turned off in sub-array 502 (at step 604) and the liquid crystal molecules associated with sub-array 502 are reconfigured to display a second image (step 606). At time t2, the $R_2G_2B_2$ spectral emitters in sub-array 502 are turned on to display the first portion of the second image illuminated with $R_2G_2B_2$ primaries (step 608). Prior to, simultaneously, or subsequent to step 608, the $R_1G_1B_1$ spectral emitters are turned off in sub-array 504, at step 610, as the liquid crystal molecules associated with subarray 504 are reconfigured for the second image (step 612). Similarly, at time t3, image 530 illustrates the $R_2G_2B_2$ spectral emitters in sub-array 504 being turned on to display the second portion of the second image in $R_2G_2B_2$ primaries (step 614). This sequence continues in a similar fashion with regard to images 540 and 550, until time t5, when the second image is fully displayed in $R_2G_2B_2$ primaries (step 616). Following that, the sequence repeats to show the next frame of the first image, again using the first set of spectral emitters $R_1G_1B_1$ for illumination. First and second images can correspond either to six-primary data, to left/right perspectives of a stereo image, to the two images of a privacy screen display, or a channel-multiplexed display.

In another embodiment, a first set of spectral emitters may not be turned all the way off, but may provide a reduced-intensity output that is barely visible through the filter that is designed to pass the emission spectra from the first set of spectral emitters. Similarly, in another phase of the duty cycle, the second set of spectral emitters need not be entirely turned off. Thus, such an embodiment may allow the spectral emitters to be partially biased when they are in their 'off-cycle,' rather than being entirely turned off. This may allow faster switching between illumination/non-illumination states since the respective spectral emitter sets will already be partially biased when in the non-illumination state.

Figure 7A:
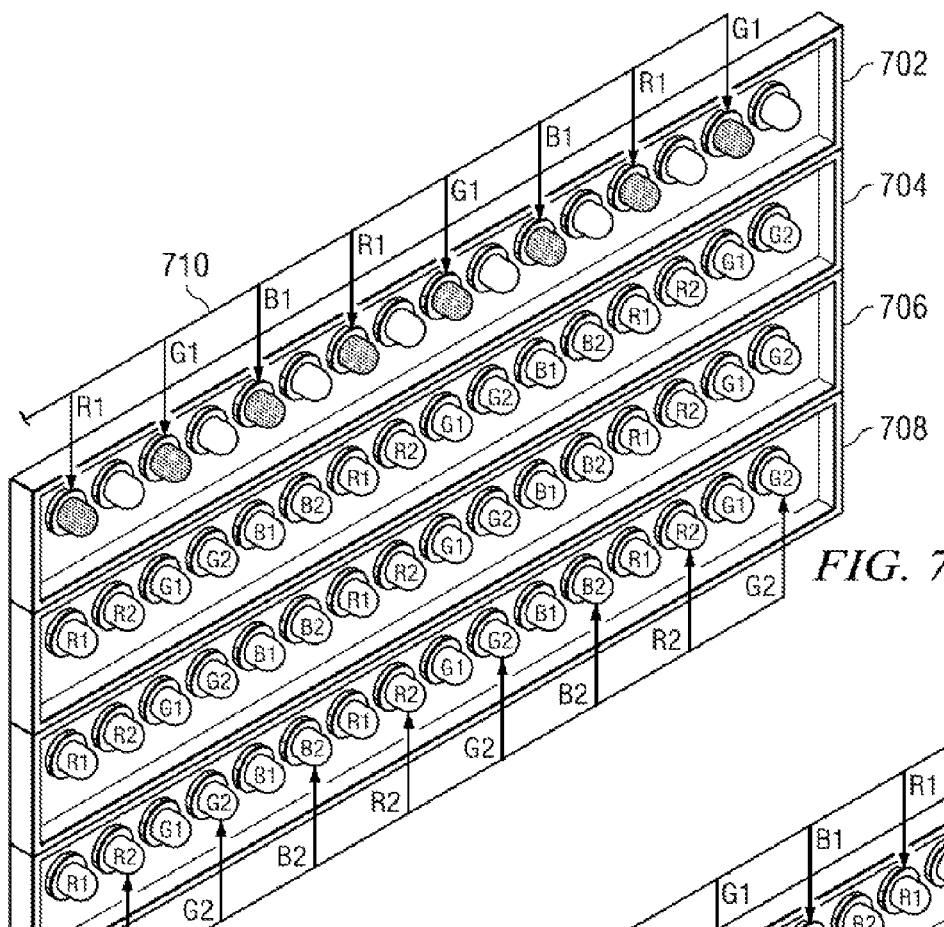
FIGS. 7A-7H are schematic diagrams illustrating an LED-based scanning backlight in operation in accordance with an embodiment of the present disclosure.
Figure 7B:
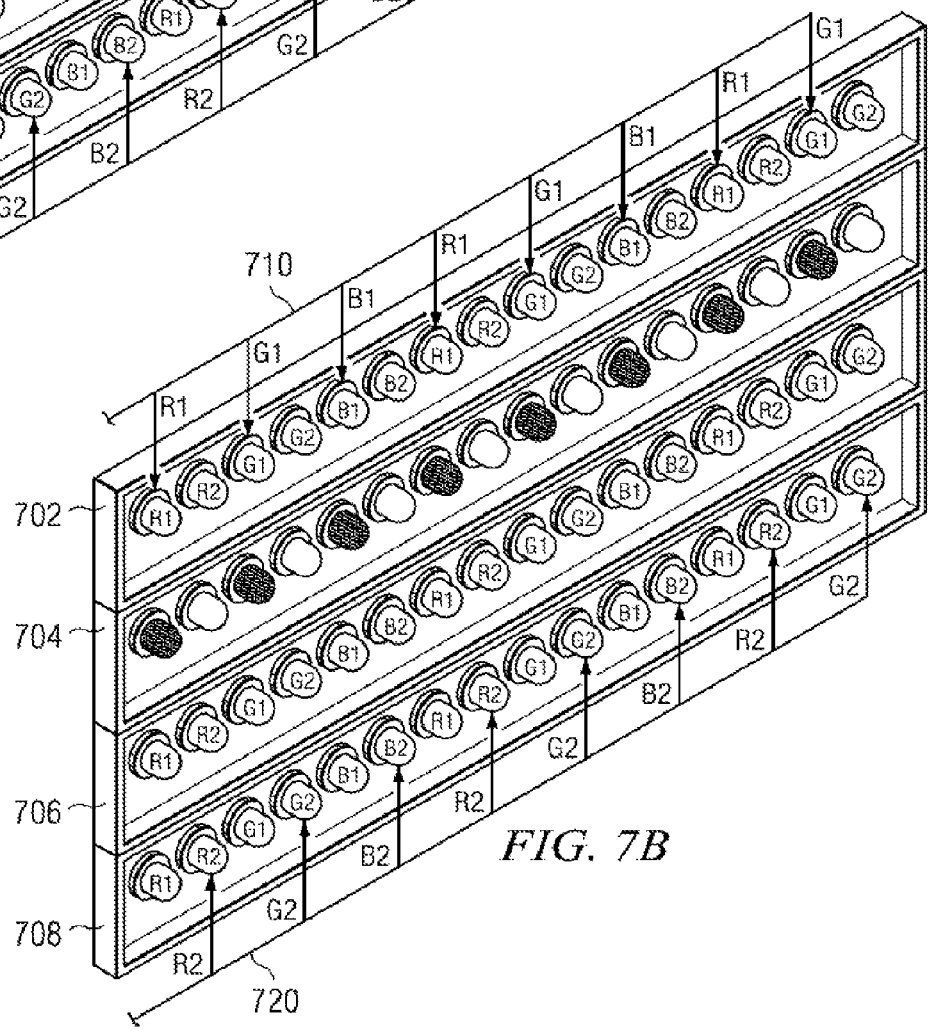
Figure 7C:
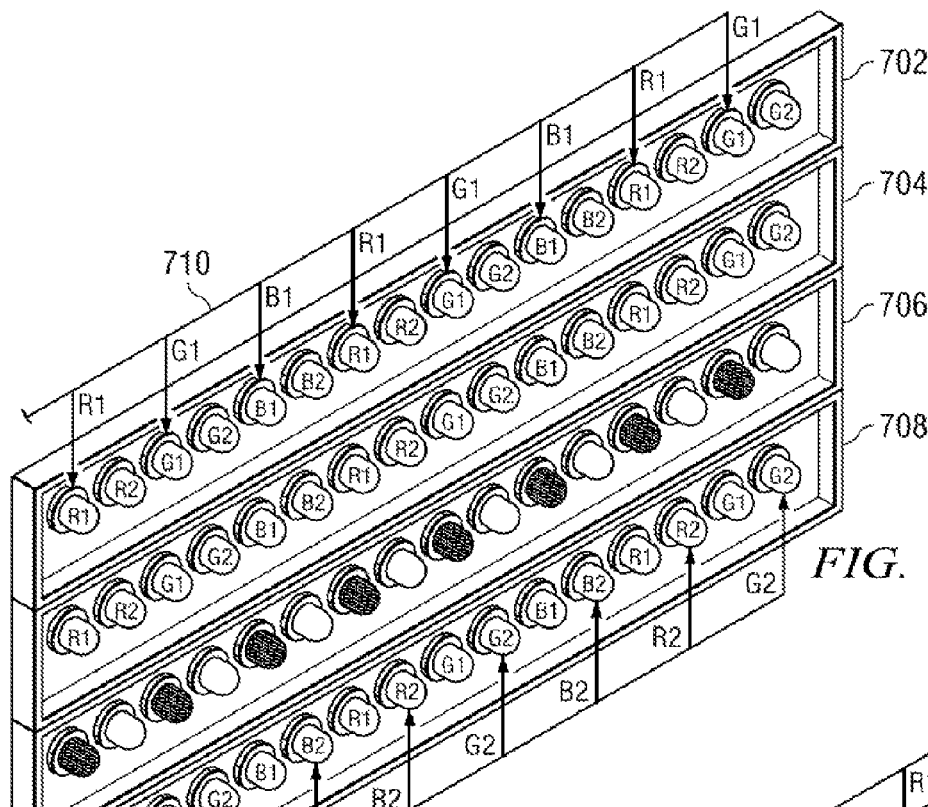
Figure 7D:
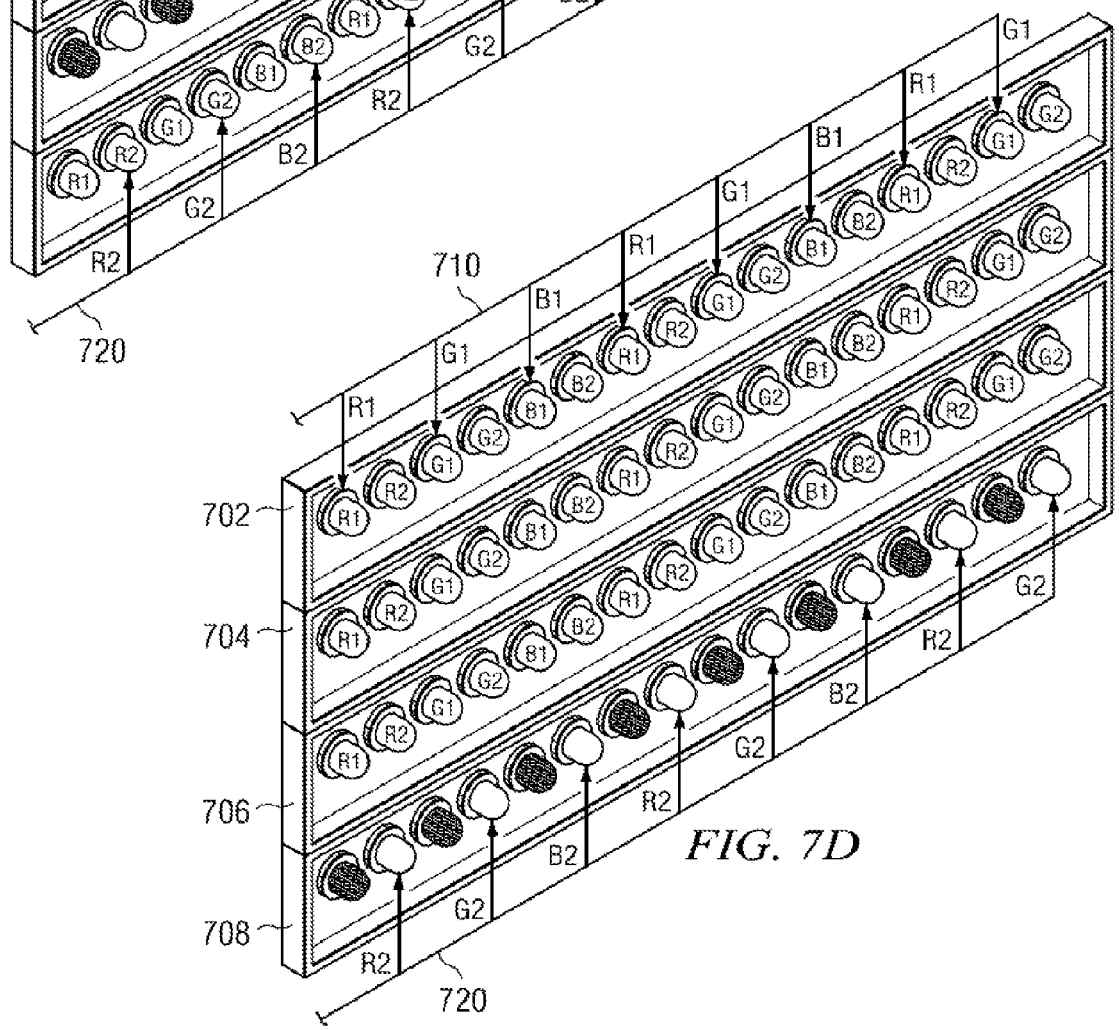
Figure 7E:
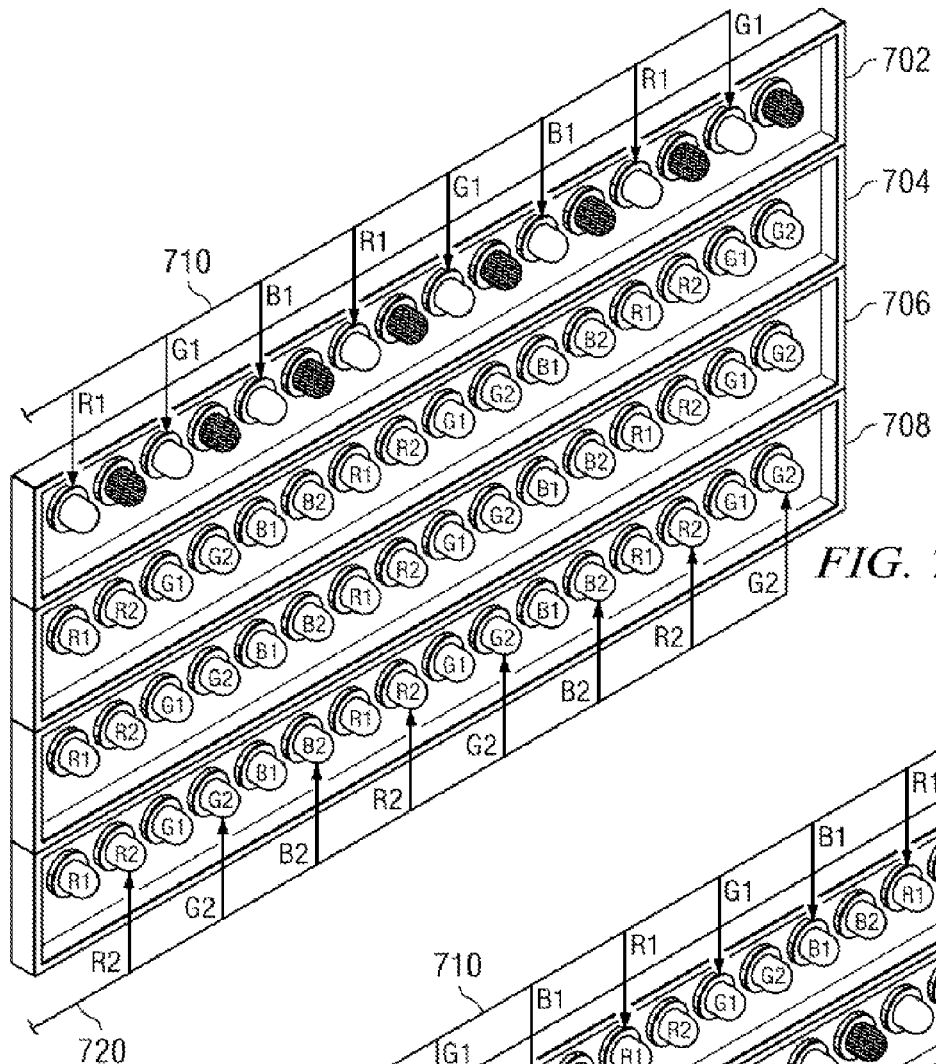
Figure 7F:
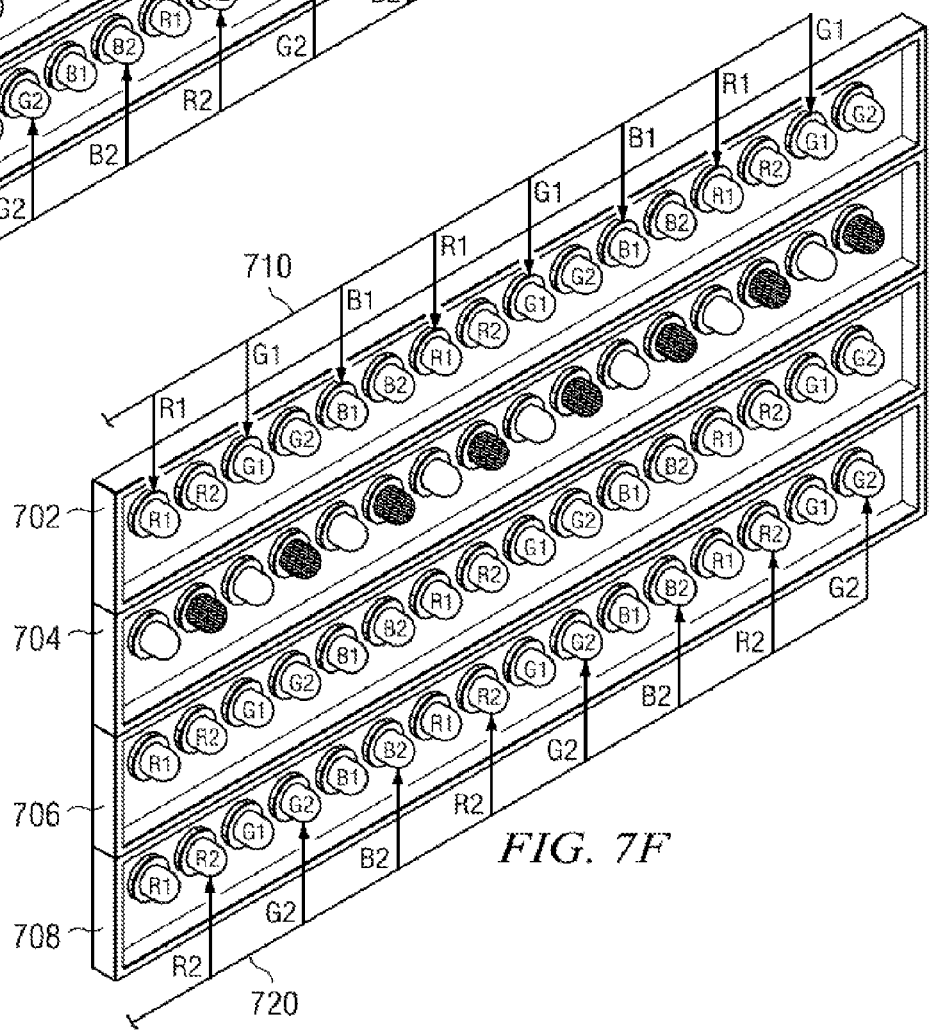
Figure 7G:
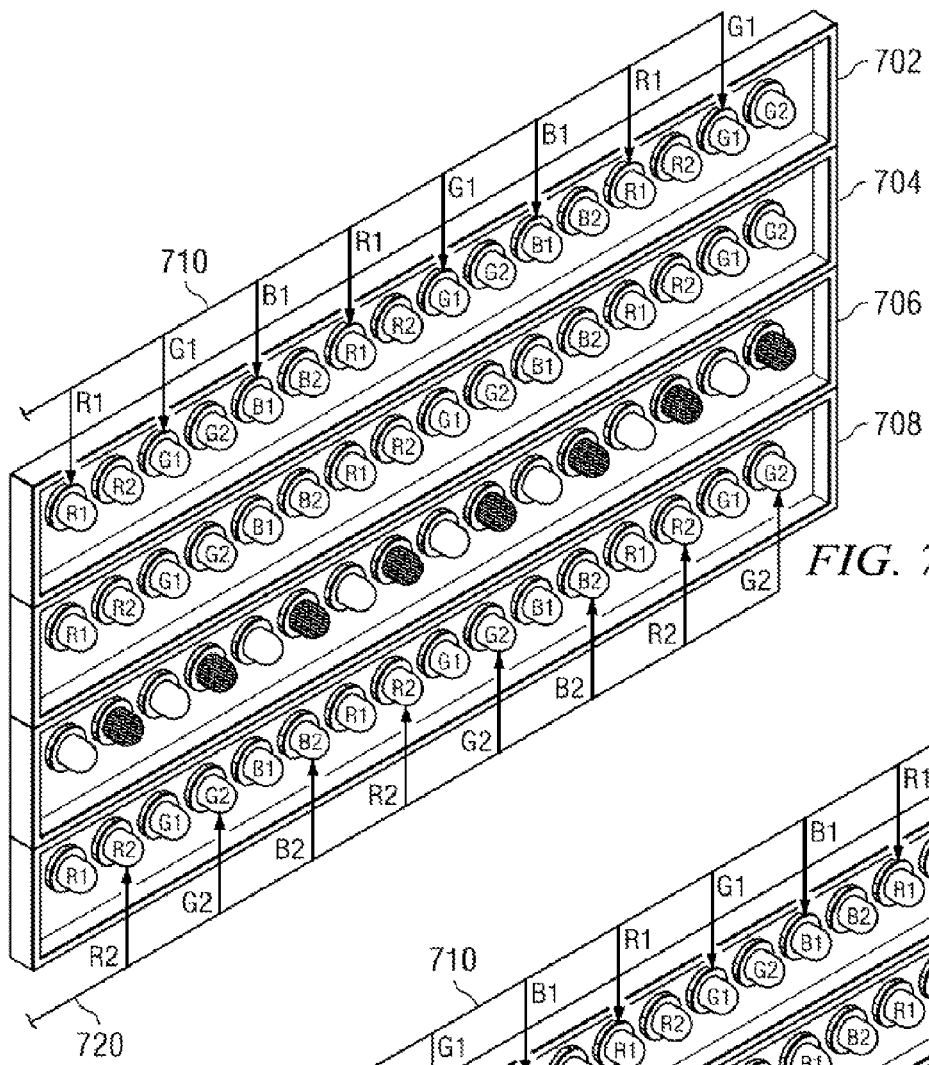
Figure 7H:
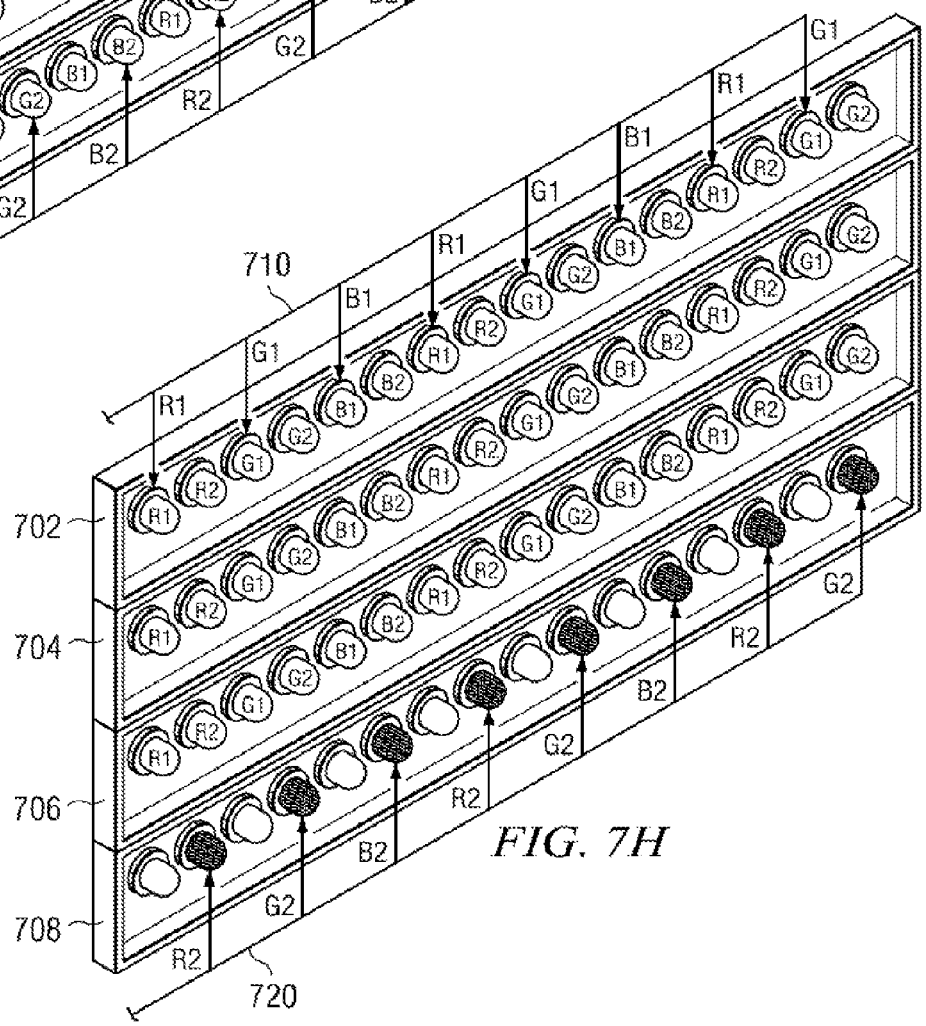
Figure 8A:
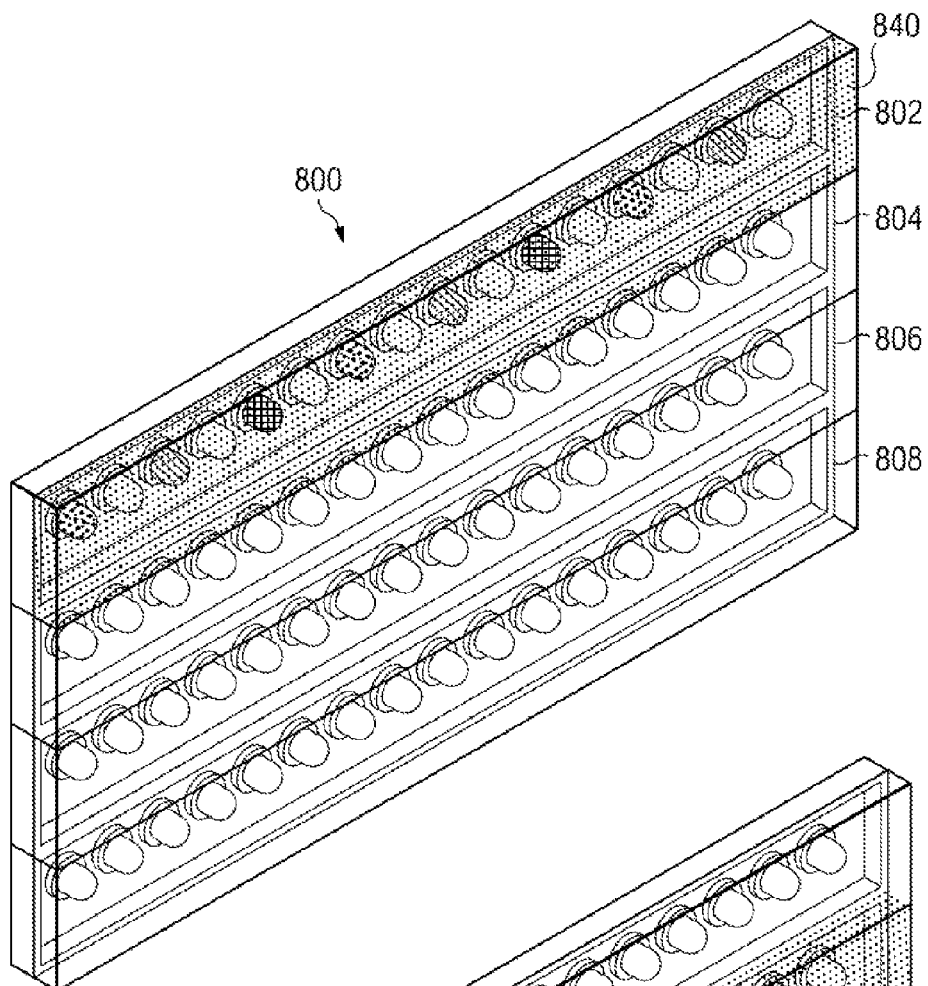
FIGS. 8A-8H are schematic diagrams illustrating an LED-based scanning backlight with light control films in operation in accordance with an embodiment of the present disclosure.
Figure 8B:
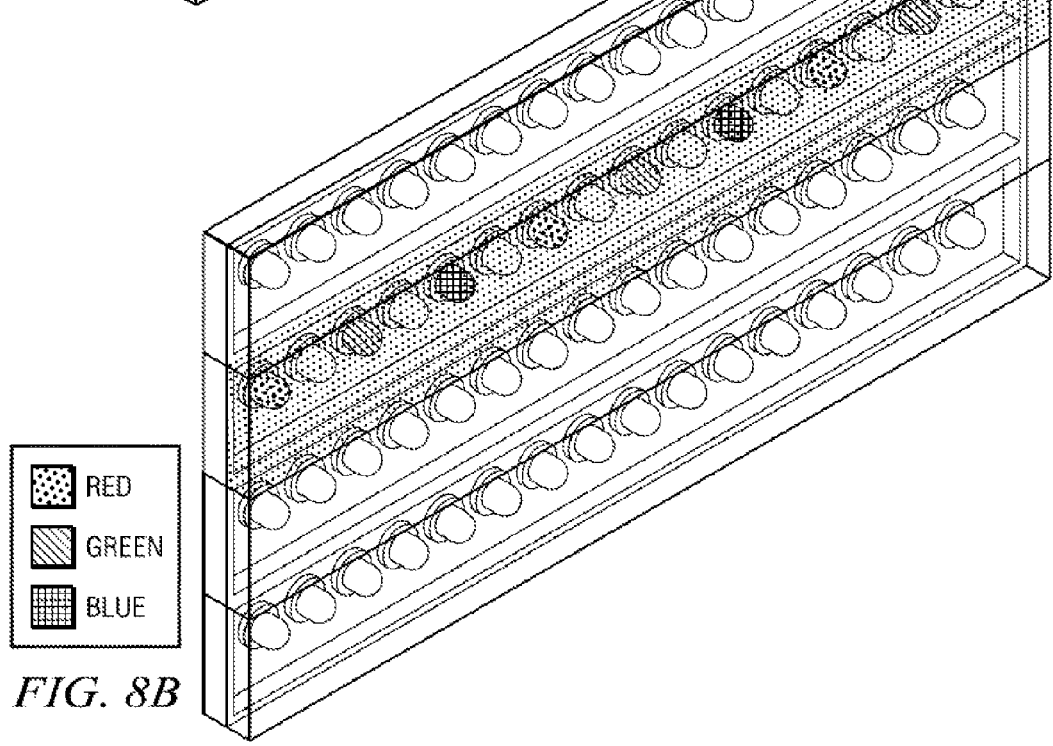
Figure 8C:
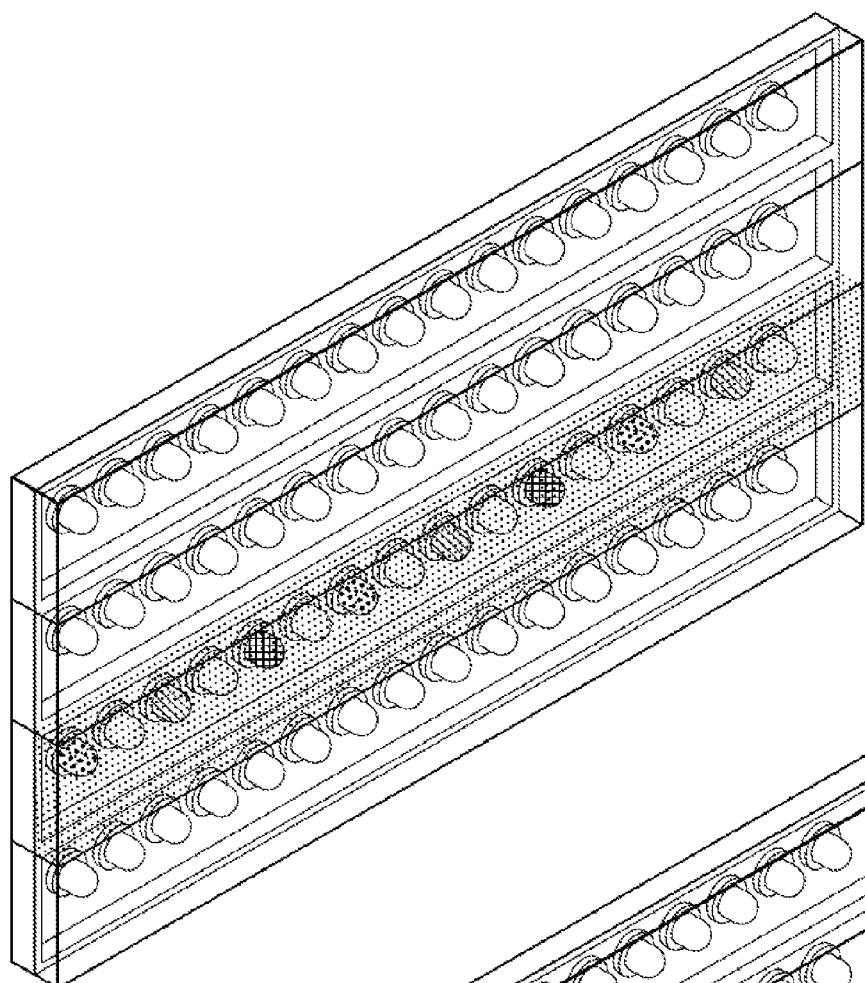
Figure 8C:
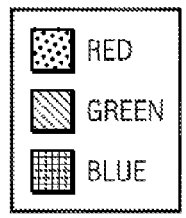
Figure 8D:
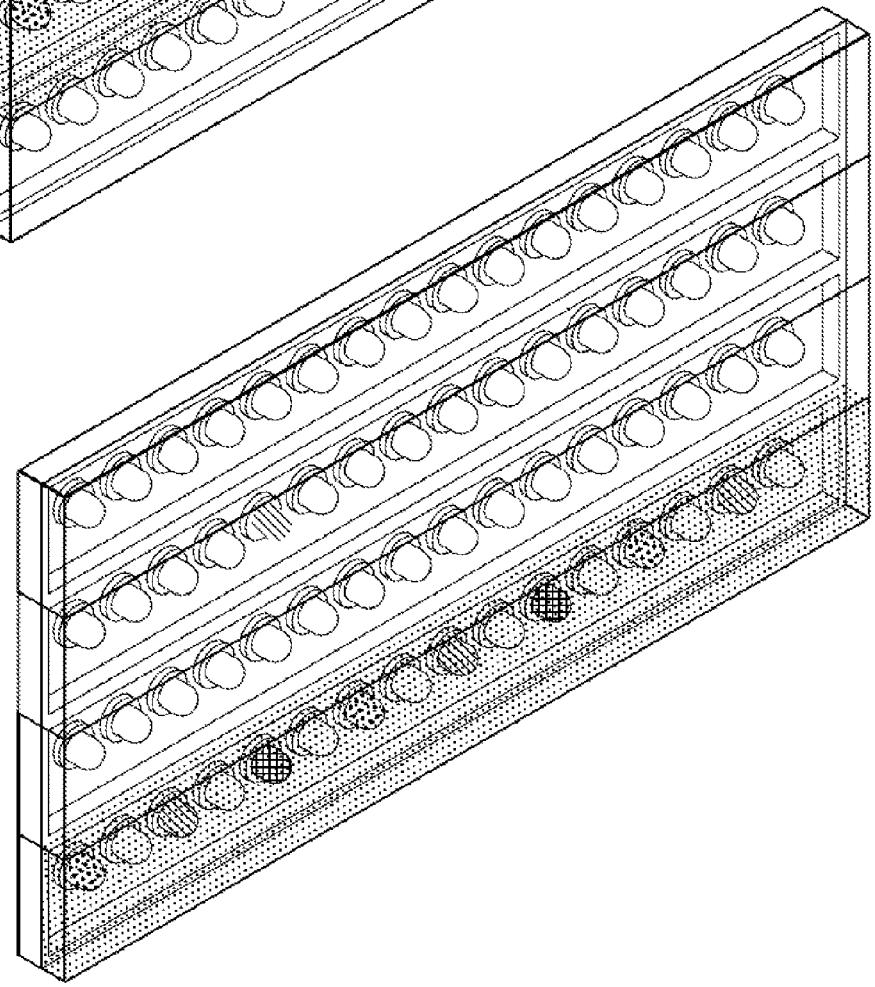
Figure 8D:
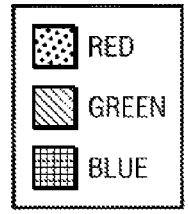
Figure 8E:
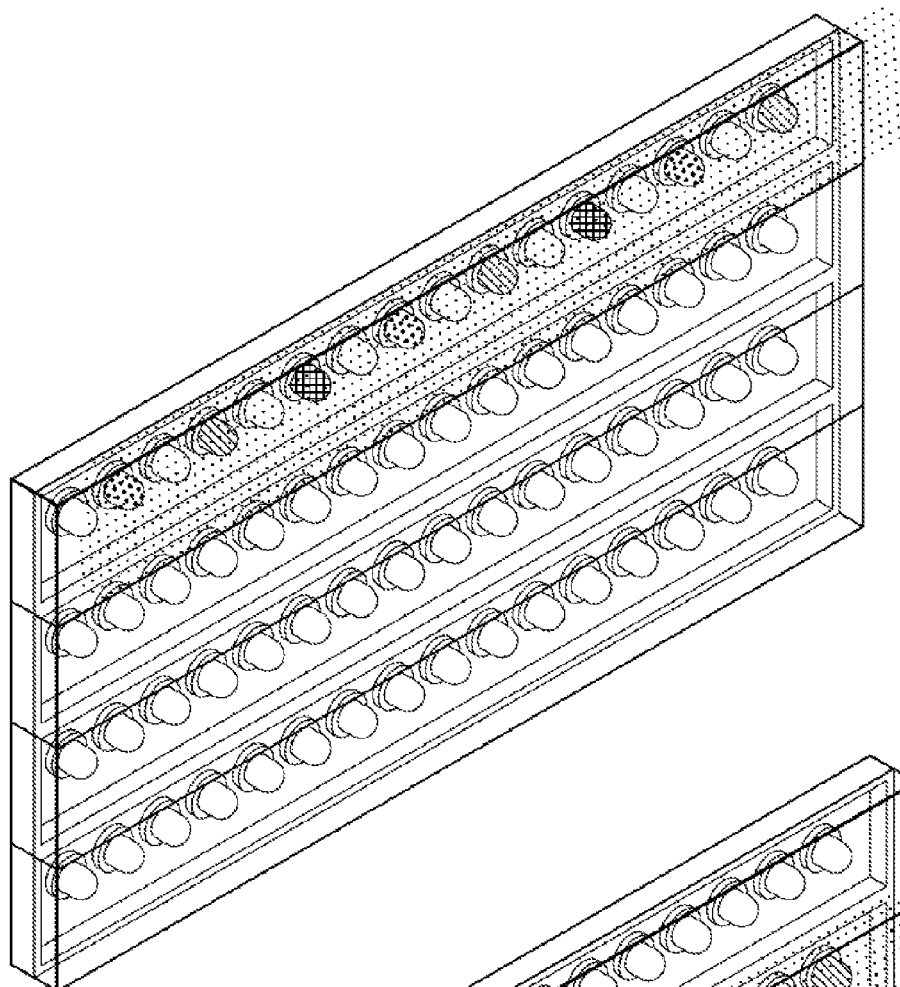
Figure 8E:
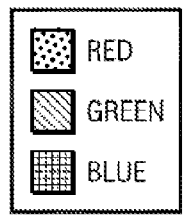
Figure 8F:
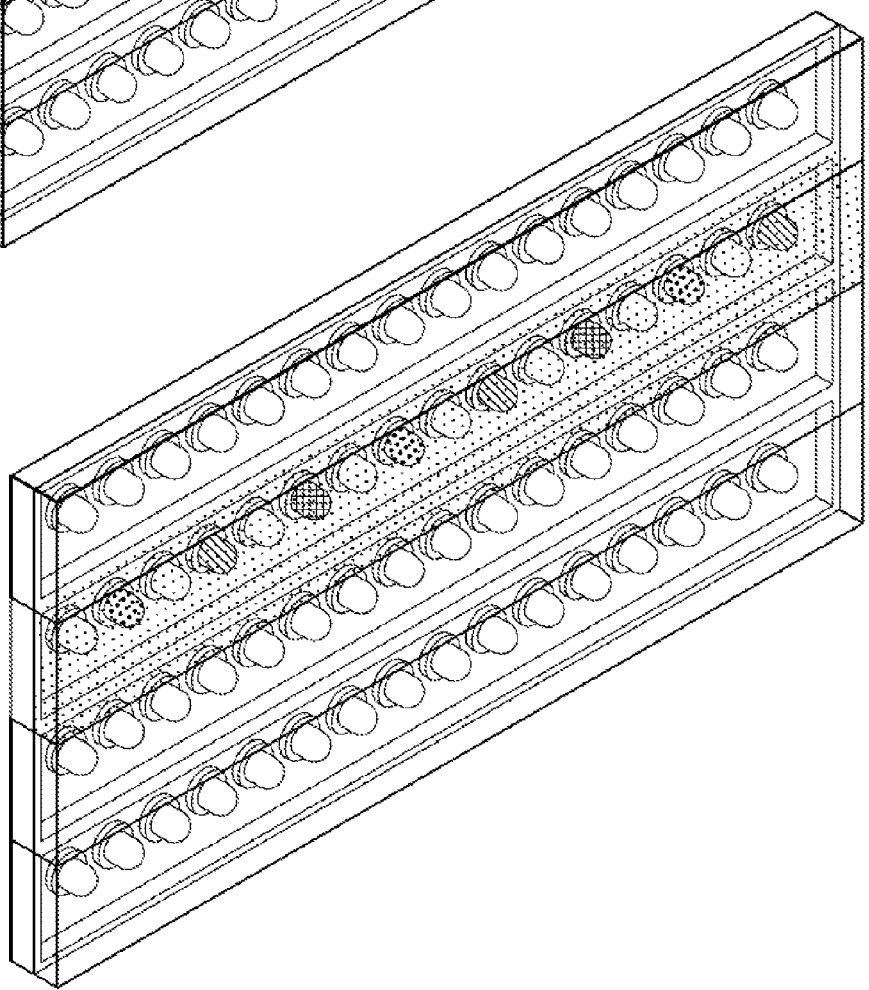
Figure 8F:
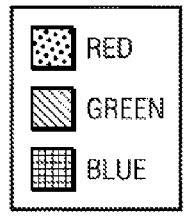
Figure 8G:
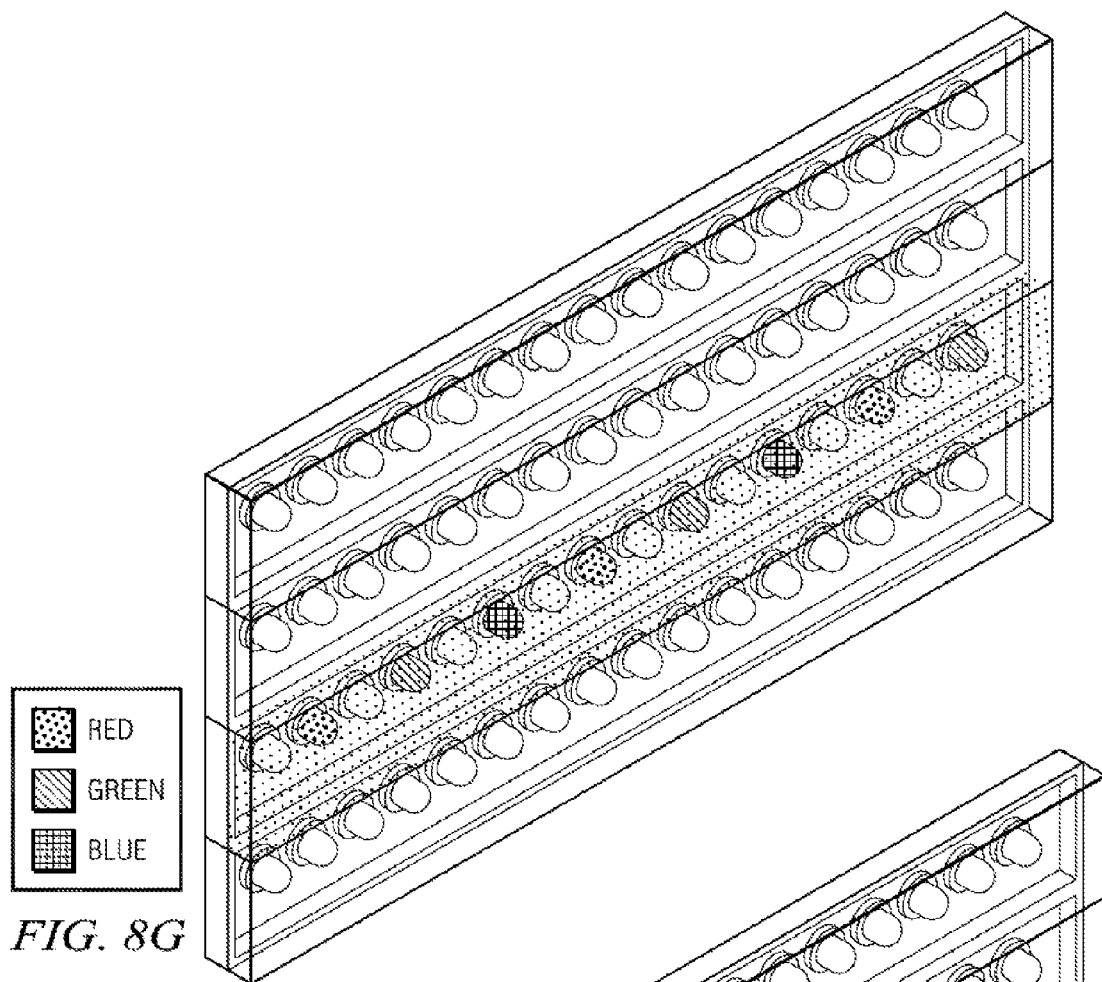
Figure 8H:
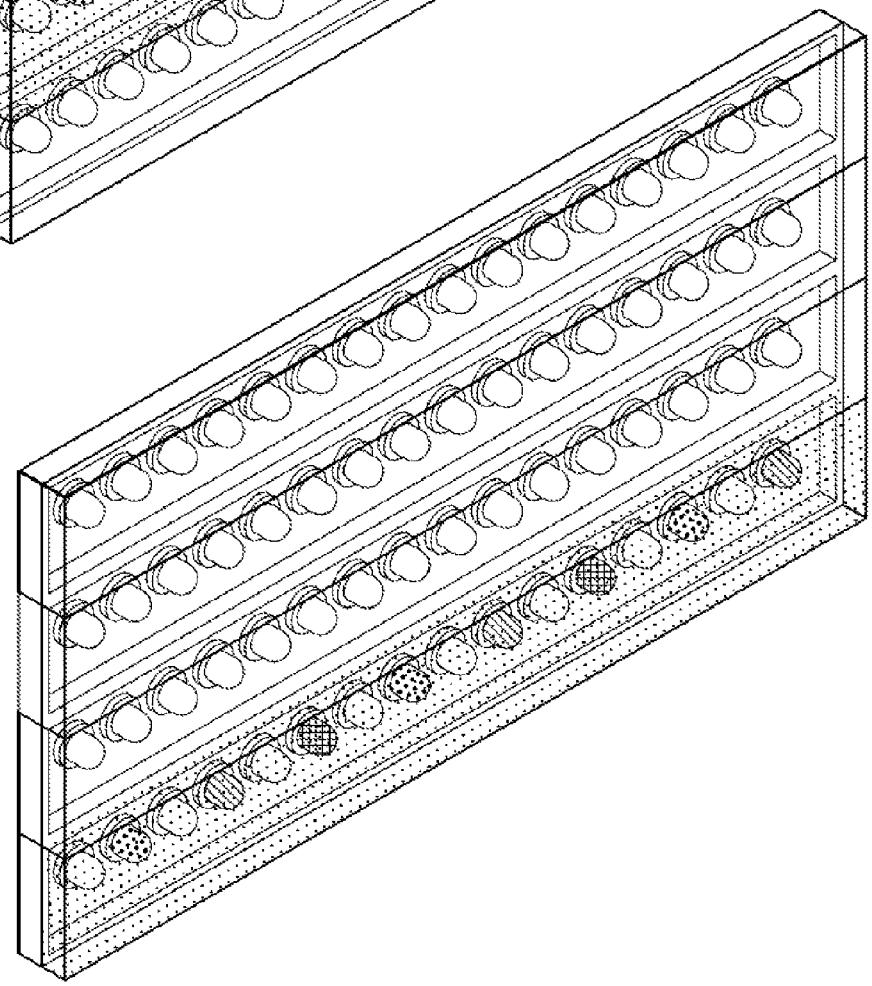

FIGS. 7A-7H illustrate an exemplary sequential illumination of sub-arrays 702-708 for first and second sets of spectral emitters 710, 720 in an exemplary backlight 700. FIG. 7A shows a first set of spectral emitters 710 in a first subarray 702 providing illumination. In sequence, FIG. 7B then shows a first set of spectral emitters 710 in a second subarray 704 providing illumination. The sequence for the first set of spectral emitters 710 continues in turn through FIGS. 7C and 7D. Following that, FIG. 7E shows a second set of spectral emitters 720 in a first subarray 702 providing illumination—and in sequence, illumination of the second set of spectral emitters 720 in second subarray 704, third subarray 706, and fourth subarray 708, as shown by FIGS. 7F-7H respectively.

FIGS. 8A-8H are schematic diagrams illustrating another exemplary embodiment of an LED-based scanning backlight 800 with light control films 840. The sequence of operation in this exemplary embodiment is similar to that shown above with reference to FIGS. 7A-7H. In this embodiment, light control film 840 may provide filtering, and dispersion of the light from each set of spectral emitters to provide homogeneity in illumination, particularly in the vicinity of the respective barriers between the subarrays. Light control film 840 may also provide matching of LED luminance and chrominance in the sub-arrays 802, 804, 806, 808.

Note that the actual operation of the LED array is largely dependent upon the functionality of the panel. For panels that are capable of global-update at fast enough rates, such a scanning backlight technique using sub-arrays may be avoided and the illumination can operate in a blinking mode with little sacrifice in brightness. In such cases, the illuminator simply alternates between flood-illuminating the panel with either of two sets of primaries (i.e., simultaneously flash all $R_1G_1B_1$ spectral emitters, then flash $R_2G_2B_2$ spectral emitters, et cetera). A black interval can be inserted between frames to allow the LC (light modulating panel) to settle. The extent of the blanking function (if used) depends upon the response time of the panel. In a progressive-scan panel, a blinking backlight can also be used, though there is some additional sacrifice in brightness.

Enhanced Color Gamut Mode

A display using a backlight 300 in accordance with the present disclosure is capable of producing a much richer color palette than conventionally backlit displays using CCFLs or three-primary LED backlights. As discussed previously, a six-primary gamut with improved saturation of each primary may be achieved in an enhanced gamut mode. Through careful selection of the six primary bands and the color filter array spectra, a greatly expanded color gamut is achievable. This permits displaying a broader range of colors that are simply not possible with conventional AMLCD displays.

When the backlight 300 is operated in an enhanced color gamut mode (displaying a two-dimensional picture), the benefits of two sets of spectral emitters with different color points may be realized. In this case, the illuminating segments can utilize all LEDs in a sub-array simultaneously for maximum brightness and color gamut. In the maximum brightness condition, the backlight 300 provides the product of R1 and R2 with the red color filter, G1 and G2 with the green color filter, and B1 and B2 with the blue color filter. When dimming is required, it can be performed in a way that is beneficial to the color gamut for the displayed image(s). Current can be selectively applied to specific spectral emitters such that the color gamut is expanded. Furthermore, specific spectral emitters may be illuminated or dimmed to provide selective illumination to areas of the display requiring enhanced or reduced brightness respectively.

The above scanning backlight functionality for optimized two-dimensional display is very similar to the requirements for implementing an optimized six-primary display, a spectral-division stereo display, a privacy screen display, or a channel-multiplexed display. By supplying at least two sets of RGB LED arrays in each backlight sub-array, a spectrally-switchable scanning backlight is realized. To the extent that sequential operation is used, at least a 2× frame rate should be employed to avoid flicker. Unlike color sequential displays, however, such operation should be free of the color-break up issues. This is because each frame contains a full representation of the image in RGB.

A six-primary display has several important applications where an enhanced gamut is beneficial. When incorporated with measures to provide accuracy in transmitting/displaying color, such displays are already very important. Nowhere is this a more timely issue than in e-commerce, where certain products cannot be accurately marketed on the internet. This is due to inconsistency, or inability, to accurately represent the product appearance on conventional displays. Already, the limitations in selling fashion apparel on the internet are significant, as the appearance on a monitor does not adequately match the actual product. These situations result in mass product returns, and a general distrust among the public in the ability to successfully carry out certain purchases on the internet. This can extend to products such as motor vehicles, furniture, interior decorating (e.g. draperies, counter tops, flooring) etc.

The six-primary display is also an important part of the infrastructure necessary to support next generation photography. Image capture devices capable of six-primary capture require both image printing and display technologies. Since a relatively low percentage of electronically captured images are viewed in hard copy, it will be increasingly important for such images to be displayed with no sacrifice in image quality. In fact, such a system enables electronic imaging to step ahead of film photography in both performance and convenience. Images captured with a six-color camera, and displayed on a large screen six-color AMLCD should provide a far superior experience to viewing hard-copy.

Insofar as the spectral emitters can be individually addressed, and the display is sufficiently fast switching, a backlight embodiment of the present disclosure can also support sequential color display. In such an embodiment, the CFA is removed, such that each pixel is capable of full-color. The demands of switching speed to support multi-functional displays using sequential color operation are of course greatly increased. A video display operated in a six-color mode probably calls for a 360 Hz field rate to avoid flicker. However, such displays are vulnerable to color breakup effects, which can further increase field rate requirements.

Privacy Screen Mode

An aspect of the present disclosure includes providing a privacy screen mode of operation for the direct view display. This mode can be used to prevent others from viewing sensitive or proprietary information, with applications including, for example, mobile computing. Such concerns can limit the work activities of professionals traveling on airliners or trains. It can also be used to view imagery or text that may be of a personal nature. In the home, the privacy screen display can be used to allow adults to view programming that may not be suitable for children. It can also be used to allow viewers to watch programming without distraction to others in line of sight of the display. In the latter cases, eyewear affixed with audio input can be worn so that there are no distractions. This allows, for example, one person to watch a television program while another reads a book in the same room.

In the privacy screen mode, two sets of spectral emitters (i.e., $R_1G_1B_1$ and $R_2G_2B_2$ LEDs) may be used to sequentially illuminate a primary and a secondary image. The primary image, illuminated by $R_1G_1B_1$ spectral emitters, is intended for viewing, while the secondary image, illuminated by $R_2G_2B_2$ spectral emitters, is intended for obscuring the primary image when viewed in natural light. The secondary image is synthesized as the inverse of the primary image, such that a neutral gray screen is observed as the time-average of the two images when viewed in natural light. Moreover, the screen will also appear content-free when viewed by conventional polarizing eyewear. However, a specialized set of wavelength-selective eyewear can decode the two images. The filters in the eyewear are designed to pass only the primary image spectrum, while blocking the secondary image spectrum.

Eyewear for use with the privacy screen mode can be fabricated using conventional interference filter technology (formed either from deposition or stretching of co-extruded films), rugate filter technology, holographic technology, or polarization interference technology. In one disclosed embodiment, both lenses are identical in construction; using a retarder stack, followed by a linear polarizer. Since the direct view display of the present disclosure may provide an analyzing polarizer, the eyewear can omit any input polarizer. Since any filtering operation is incomplete without this polarizer, the eyewear will appear neutral in natural (unpolarized) light. All other advantages of polarization interference, such as improved light control (through lack of reflection), and improved field-of-view are considered helpful in presenting a high contrast image that is comfortable to observe for extended periods. Aspects, such as low spectral leakage of the secondary primary set, are key aspects to providing high contrast, since the display is operated in a 50% duty ratio mode. Without the privacy-screen eyewear, secondary image ghosts, which are by definition inverse images, tend to strongly wash out the primary image.

An important aspect of polarization interference filter eyewear is that uniform retarder stacks are realizations of finite impulse response (FIR) filters. Increased retardation in the base film has an inverse relationship with sampling rate, thus increasing oscillations in the frequency (wavelength) domain. Such periodic comb functions are utilized for partitioning the spectrum according to primary set, and are a natural phenomenon in FIR filters. Through network synthesis techniques, as described in the commonly assigned U.S. Pat. No. 5,751,384, which is incorporated herein by reference, retarder stacks can be designed according to desired edge functions and duty ratios. Further details of design approaches for retarder stacks are described in greater detail in U.S. patent application Ser. No. 09/754,091, which is hereby incorporated by reference herein.

Conversely, thin-film interference filters (such as those taught for use with the Jorke system), which are realizations of infinite impulse response (IIR) filters require many layers to implement a narrow notch, with very tight control on layer thickness to meet stringent center wavelength and band edge wavelength tolerances. Multiple notches of course require stacks of individual notch filters. Multi-notch interference filters are difficult to fabricate with tight tolerances on 50% points, and are destined to be an expensive option. Moreover, filters with such high wavelength selectivity are sensitive to incidence angle. The view angle effect allows the secondary image to bleed through and reduce contrast and uniformity in appearance.

Multiplexed Image Mode

In accordance with another aspect of the disclosure, viewers wearing different sets of eyewear can independently view different multimedia images on the same display using time multiplexing of channels.

In a channel-multiplexed display mode, the time-averaged superposition of imagery from two channels is observed in natural light. A first viewer wears a first set of eyewear that passes imagery displayed in the first color gamut using primaries R1G1B1. A second viewer wears a second set of eyewear that passes imagery displayed in the second color gamut using primaries R2G2B2. Accordingly, through the respective eyewear, the first viewer sees imagery corresponding to a first color gamut and the second viewer sees imagery corresponding to the second color gamut. To the extent that the images as observed through the filters are spectrally non-overlapping, no ghost images of the alternate channel should be observed. With a display operated at 120 Hz, each person independently views a 50% duty cycle image at 60 Hz. Thus, for example, an application of the multiplexed image mode allows for watching two television channels on the same direct view display, with each channel being presented occupying the entire screen. Another application allows for a first viewer watching television while a second viewer surfs the internet. A third exemplary application allows for a first video game player to view a first displayed image for a multiplayer video game, while a second player views a second displayed image. Of course, it should be apparent that various other applications may utilize multiplexed image mode.

Stereo Image Mode

Stereo imagery is used to create the appearance of depth on a 2D display. Unlike some other stereo display methods, such as micro-polarizer array, the present disclosure provides three-dimensional imagery without loss in spatial resolution. Provided that the display can be operated sufficiently fast to avoid the effects of flicker, a superior 3D experience can be realized.

Through careful backlight designs, high quality 3D displays can be implemented with practically no degradation to 2D performance, and with minimal additional hardware. A stereo display according to the present disclosure is operated in a similar fashion to the above-described privacy screen display or enhanced gamut six-primary display. In the stereo imaging mode, first and second images are sequentially presented that represent left-right views, which (preferably) have substantially non-overlapping spectral components through the action of the backlight having first and second sets of spectral emitters (as discussed previously). These views appear overlaid on the display when viewed in natural light. An appropriate set of eyewear is used to decode the images, such that the left view image is blocked by the right lens and the right view image is blocked by the left lens. This can in principle be accomplished using a number of technologies, as discussed above. However, polarization interference filter technology is superior to other technologies in the aspects discussed previously.

In a described stereo display embodiment, polarization-interference eyewear is used to separate left and right views of an image. The lenses of such eyewear comprise a stack of linear retarder films, followed by an analyzing polarizer. According to the described embodiment, a linearly polarized output is provided by the analyzing polarizer of the AMLCD, which is oriented parallel to the polarizer in a first lens, and is crossed with the polarizer of a second lens. The retarder stack design is identical in the first and second lens. Furthermore, the retarder stack design, in particular the duty-ratio, is selected so as to maximize light coupling to each eye, with minimal spectral overlap between the lenses (which causes image cross-talk).

Eyewear Design Considerations

Unlike the privacy screen eyewear discussed previously, the stereo-display eyewear is used to alternately present different images to each eye sequentially. In construction, the eyewear is much as discussed previously. However, for stereoscopic viewing applications, the spectra associated with each left and right filters are, like the illumination source, substantially non-overlapping. The extent of ghost image appearance (neglecting software corrections) depends largely on the dynamic range of the filter, and the extent of spectral overlap of filters in the vicinity of LED (or other spectral emitter) emission. The more confined the source emission (a laser being best, and a super resonant LED being the next best), the less demanding the filtering operation needed by the eyewear. In general, improved dynamic range is desirable, though selective sources permit a relaxation in filter transition slope. In practice, the extent of this relaxation depends upon tolerances in emission center wavelength in manufacturing. Accordingly, utilization of super resonant LEDs as spectral emitters may provide a good compromise solution that addresses the above design factors.

An embodiment of stereo-display eyewear includes the use of retarder stacks for left and right filters using the identical retardation value. Using network synthesis techniques, as described in the commonly assigned U.S. Pat. No. 5,751,384 incorporated by reference, the duty ratio for each lens can be selected. Referring back to FIG. 4I, the graph illustrates exemplary transmission profiles for an embodiment that includes first and second polarization interference filters for viewing respective first and second images illuminated with respective first and second sets of spectral emitters. The profile for each filter has a series of steep transition slopes with flat pass-bands and stop-bands. According to the present disclosure, the duty ratio of the spectral profile of each lens may be selected to control the extent of spectral overlap. When the parallel polarizer spectrum of the left image is overlaid with the crossed polarizer spectrum of the right image, a constant overlap factor is assured. This is a consequence of using identical retarder films in each stack, in combination with the principles of conservation of power.

Such polarization-interference eyewear lenses are, much like conventional 3D polarizing lenses, neutral in appearance, as retarder stacks are fully transparent in natural light. In that respect, the viewer will appear to be wearing matched neutral eyewear to any observer. To the wearer, the natural world will likewise appear identical through each lens, and will only appear different when viewing a polarized input. The lenses will thus act to diminish the brightness of surroundings by 50%, with (neglecting the filtering operation of the lens) little insertion loss when viewing the display. Using current high-performance linear polarizers, internal insertion losses of polarized light is only about 6% in the green.

According to an embodiment of the present disclosure, absorption-based eyewear with highly selective spectral filtering provided by polarization interference can be used to give optimum performance in comfort, see-through, brightness, and cross-talk. Moreover, the lenses can be formed in either cylindrical shapes, or even thermoformed for compound curvature, to minimize field-of-view effects. Retarder stacks based on biaxial-stretched retarder film are additionally virtually insensitive to angle-of-incidence spectral shifts. Using eyewear can also help with head tracking for full surround 3D, as the infinity point won't move with the user.

As discussed previously, in some embodiments, the input polarizer for each filter may be omitted when using a display that provides a linearly polarized output, thus there is one and only one polarizer in each filter. The addition of an input polarizer on each filter reduces the throughput slightly, but it may also have an effect on the appearance of the natural world. (Such a filter, with an input polarizer is taught by commonly-assigned U.S. Pat. No. 7,106,509, and is hereby incorporated by reference). This can take the form of a luminance and/or a chrominance difference as viewed through each filter. Since a viewer typically takes in both the displayed image, and some portion of the surroundings, the differences seen through each filter may be distracting. Moreover, it is difficult to correct for such differences, in part because stereo displays can be viewed in a number of spectrally distinct ambient lighting conditions (e.g., sunlight, fluorescent light, incandescent light, et cetera). While the conditions of the displayed image can be carefully controlled, the relative appearance of the natural world can vary dramatically when viewed through each filter. As such, it may be desirable to provide a left/right filter system that is matched in chrominance and luminance under all ambient light conditions. When viewing the display, careful corrections can be applied by altering the spectral emissions of R1G1B1 and R2G2B2 to match the chrominance and luminance of the white point seen by each eye, which are not possible in the natural world. By omitting the input polarizer of each filter, these conditions are most likely to occur, insofar as the natural world is virtually unpolarized.

A beneficial aspect of polarization interference eyewear is in contrast enhancement. The filtration of light, such that only the appropriate set of primaries (i.e., R1G1B1 or R2G2B2) are allowed to pass, has the effect of eliminating broad band glare incident on the display from ambient sources. While the addition of an input polarizer to each lens eliminates the neutral appearance, it has the benefit of further increasing contrast by rejecting the glare by blocking the orthogonal polarization. In addition, the input polarizer minimizes the sensitivity to head tilt on image cross-talk. In this case, head tilt acts only to decrease brightness of the display.

A technique for decreasing sensitivity to head tilt, without the addition of a secondary polarizer, is to place a quarter-wave retarder (or circular retarder) on both the display and eyewear. A quarter-wave retarder, oriented at 45-degrees with respect to the polarizer on the display, produces substantially circular polarization of a particular handedness. A secondary matched quarter-wave retarder, oriented at minus 45-degrees on the eyewear, has the effect of canceling the polarization effect of the former. The transformation from a linear to a quasi-circular coordinate system produces first-order elimination in head tilt sensitivity. For zero-order quarter-wave retarders, the retardation values are preferably closely matched to minimize ghost images.

In another embodiment, quarter-wave retarders are provided on both the display and eyewear, as described above, with the addition of an input polarizer on the eyewear. In this way, cross-talk is minimized, while substantially reducing the sensitivity of throughput on head-tilt. Such eyewear may be particularly suited to the privacy screen displays discussed above, where the lenses in each eye are matched. In the case where filters in left and right eyes are matched (e.g., in privacy screen and multiplexed display modes), the objectionable effect of appearance difference of the natural world does not apply.

The foregoing provides various embodiments, which are intended to illustrate the considerations that come into play with multi-functional displays. It shows that a multi-functional display capable of various modes of operation is possible with a single backlight. It further shows that no special film or modulator is required, adding to the cost of the display, to implement multi-functional displays. A number of factors contribute to the selection of LED backlight design to achieve a balanced output when operating in (e.g.) stereo mode. Clearly this example shows that the photopic response is critical to the long-red output requirements, perhaps arguing for a blue shift in center wavelength. The reality is that a number of factors, including cost of spectral emitters (versus emission wavelength), spectral broadening, availability of center wavelength and peak output power, lifetime (and changes over lifetime), thermal management, number of each type of LED, etc., are all important practical design considerations.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

What is claimed is:

1. Eyewear operable to convey a first image to a first eye and a second image to a second eye, the first image comprising a first polarized light bundle, the second image comprising a second polarized light bundle, wherein the first and second polarized light bundles comprise substantially discrete spectral components, the eyewear comprising:
   a first filter comprising a first retarder stack and a first polarizer, the first polarizer having a first polarizing axis; and
   a second filter comprising a second retarder stack and a second polarizer, the second polarizer having a second polarizing axis substantially orthogonal to the first polarizing axis,
   wherein the first and second retarder stacks comprise substantially identical retardance.

2. Eyewear according to claim 1, wherein the first polarized light bundle comprises:
   a first spectral component selected from a pair of long band spectral components (R1, R2),
   a second spectral component selected from a pair of middle band spectral components (G1, G2), and
   a third spectral component selected from a pair of short band spectral components (B1, B2);

wherein the second polarized light bundle comprises:
fourth, fifth, and sixth spectral components comprising a complementary selection of spectral components to those selected for the first set of spectral components.

3. Eyewear according to claim 2, wherein the R1 and R2 spectral components lie substantially within the sensitive wavelengths of the L-cone receptors in a human eye, wherein the G1 and G2 spectral components lie substantially within the sensitive wavelengths of the M-cone receptors in the human eye, and wherein the B1 and B2 spectral components lie substantially within the sensitive wavelengths of the S-cone receptors in the human eye.

4. Eyewear according to claim 1, wherein the first filter has a passband characteristic operable to transmit the first light bundle, and wherein the second filter has a passband characteristic operable to transmit the second light bundle.

5. Eyewear according to claim 4, wherein the first filter has a stopband characteristic operable to block the second light bundle, and wherein the second filter has a stopband characteristic operable to block the first light bundle.

6. Eyewear according to claim 1, wherein the retarder stacks comprise birefringent polymer film.

7. Eyewear according to claim 1, wherein each retarder stack comprises N≥2 retarder films, wherein each retarder stack is designed to comprise an FIR filter, and thereby is operable to generate at least N+1 spatially offset light pulses in response to a linearly polarized light impulse input, the FIR filter operable to filter at least one band of light.

8. Eyewear operable to convey a first image to a viewer and to block a second image from the viewer, the first image comprising a first polarized light bundle, the second image comprising a second polarized light bundle, wherein the first and second polarized light bundles comprise substantially discrete spectral components, the eyewear comprising:
a left eye and a right eye filter, each filter comprising:
a retarder stack; and
one and only one polarizing element having a polarization axis,
wherein the first and second retarder stacks comprise substantially identical retardance,
wherein the polarization axis of the left eye polarizing element is parallel to the polarizing axis of the right eye polarizing element.

9. Eyewear according to claim 8, wherein the left and right eye filters have substantially identical passband characteristics.

10. Eyewear according to claim 8, wherein the first polarized light bundle comprises:
a first spectral component selected from a pair of long band spectral components (R1, R2),
a second spectral component selected from a pair of middle band spectral components (G1, G2), and
a third spectral component selected from a pair of short band spectral components (B1, B2);
wherein the second set of spectral components comprises:
fourth, fifth, and sixth spectral components comprising a complementary selection of spectral components to those selected for the first set of spectral components.

11. The method according to claim 10, wherein the R1 and R2 spectral components lie substantially within the sensitive wavelengths of the L-cone receptors in a human eye, wherein the G1 and G2 spectral components lie substantially within the sensitive wavelengths of the M-cone receptors in the human eye, and wherein the B1 and B2 spectral components lie substantially within the sensitive wavelengths of the S-cone receptors in the human eye.

12. Eyewear according to claim 8, wherein each retarder stack comprises N≥2 retarder films, wherein each retarder stack is designed to comprise an FIR filter, and thereby is operable to generate at least N+1 spatially offset light pulses in response to a linearly polarized light impulse input, the FIR filter operable to filter at least one band of light.

13. Eyewear according to claim 2, wherein R1 has an emission peak with a longer wavelength than R2, wherein G1 has an emission peak with a longer wavelength than G2, and wherein B1 has an emission peak with a longer wavelength than B2.

14. Eyewear according to claim 2, wherein the first/second polarized light bundles comprise one of the following combinations: R1G1B1/R2G2B2, R1G2B1/R2G1B2, R1G1B2/R2G2B1, and R1G2B2/R2G1B1.

15. Eyewear according to claim 2 the first light bundle is defined by a first RGB triangle of an EBU color gamut diagram, and the second light bundle is defined by a second RGB triangle of the EBU color gamut diagram including colors outside the first RGB triangle.

* * * * *